United States Patent
Vikram et al.

(10) Patent No.: US 12,516,087 B2
(45) Date of Patent: Jan. 6, 2026

(54) METHODS AND COMPOSITIONS COMPRISING THERAPEUTIC GAMMA PEPTIDE NUCLEIC ACID-BASED MOLECULES

(71) Applicants: UNIVERSITY OF IOWA RESEARCH FOUNDATION, Iowa City, IA (US); UNIVERSITY OF CONNECTICUT, Farmington, CT (US)

(72) Inventors: Ajit Vikram, Iowa City, IA (US); Kaikobad Irani, Iowa City, IA (US); Ravinder Reddy Gaddam, Iowa City, IA (US); Raman Bahal, Glastonbury, CT (US); Karishma Mohan Dhuri, Mansfield Center, CT (US)

(73) Assignees: UNIVERSITY OF IOWA RESEARCH FOUNDATION, Iowa City, IA (US); UNIVERSITY OF CONNECTICUT, Farmington, CT (US)

(*) Notice: Subject to any disclaimer, the term of this patent is extended or adjusted under 35 U.S.C. 154(b) by 430 days.

(21) Appl. No.: 18/165,809

(22) Filed: Feb. 7, 2023

(65) Prior Publication Data

US 2023/0322862 A1    Oct. 12, 2023

Related U.S. Application Data

(60) Provisional application No. 63/307,340, filed on Feb. 7, 2022.

(51) Int. Cl.
*C07K 14/00* (2006.01)
*A61K 38/00* (2006.01)
*C12N 15/113* (2010.01)

(52) U.S. Cl.
CPC .......... *C07K 14/003* (2013.01); *C12N 15/113* (2013.01); *A61K 38/00* (2013.01)

(58) Field of Classification Search
CPC .............. C07K 14/003; C12N 15/113; C12N 2310/113; C12N 2310/3181; C12N 2310/3183; C12N 2310/3513; A61K 38/00

See application file for complete search history.

(56) References Cited

FOREIGN PATENT DOCUMENTS

WO    WO-2016005981 A1 * 1/2016 ................ A61P 7/00

OTHER PUBLICATIONS

Sahu B et al. Synthesis and Characterization of Conformationally Preorganized (R)-Diethylene Glycol-Containing gamma-peptide Nucleic Acids with Superior Hybridization Properties and Water Solubility. 2011. The Journal of Organic Chemistry. 76,5614-5627. (Year: 2011).*

* cited by examiner

*Primary Examiner* — Paul J Holland
(74) *Attorney, Agent, or Firm* — Quarles & Brady, LLP

(57) ABSTRACT

Disclosed are compounds and methods for the treatment of diseases or disorders associated with expression of miR-122. More specifically, γ peptide nucleic acid (γPNA) inhibitors of miR-122 and methods of using the same are disclosed.

11 Claims, 13 Drawing Sheets

Specification includes a Sequence Listing.

miR-122-5p     5' UGG AGU GUG ACA AUG GUG UUU G 3'
γP-122-I       H-KKK-CAA ACA CCA TTG TCA CAC TCC A-KKK-NH₂
γP-SC          H-KKK-GTA ACG AGT GTT GGT TGT GAG T-KKK-NH₂

■ Regular base, ■ Mini-PEG modified base, K= lysine

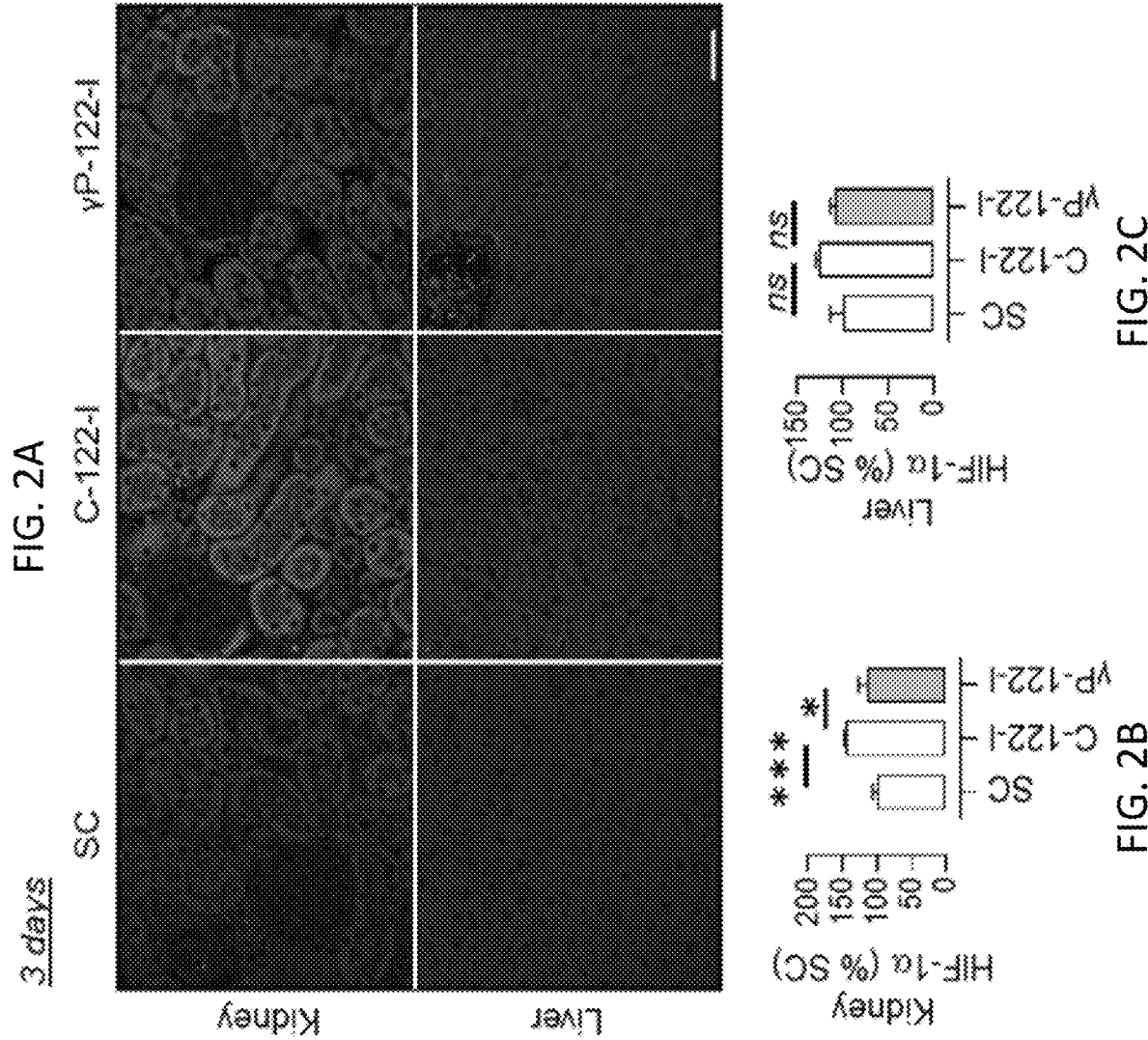

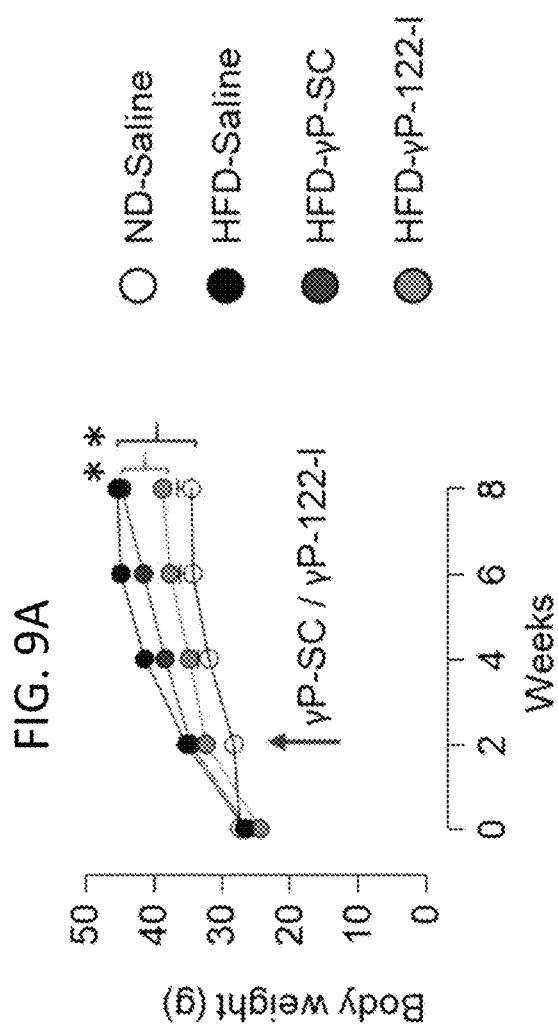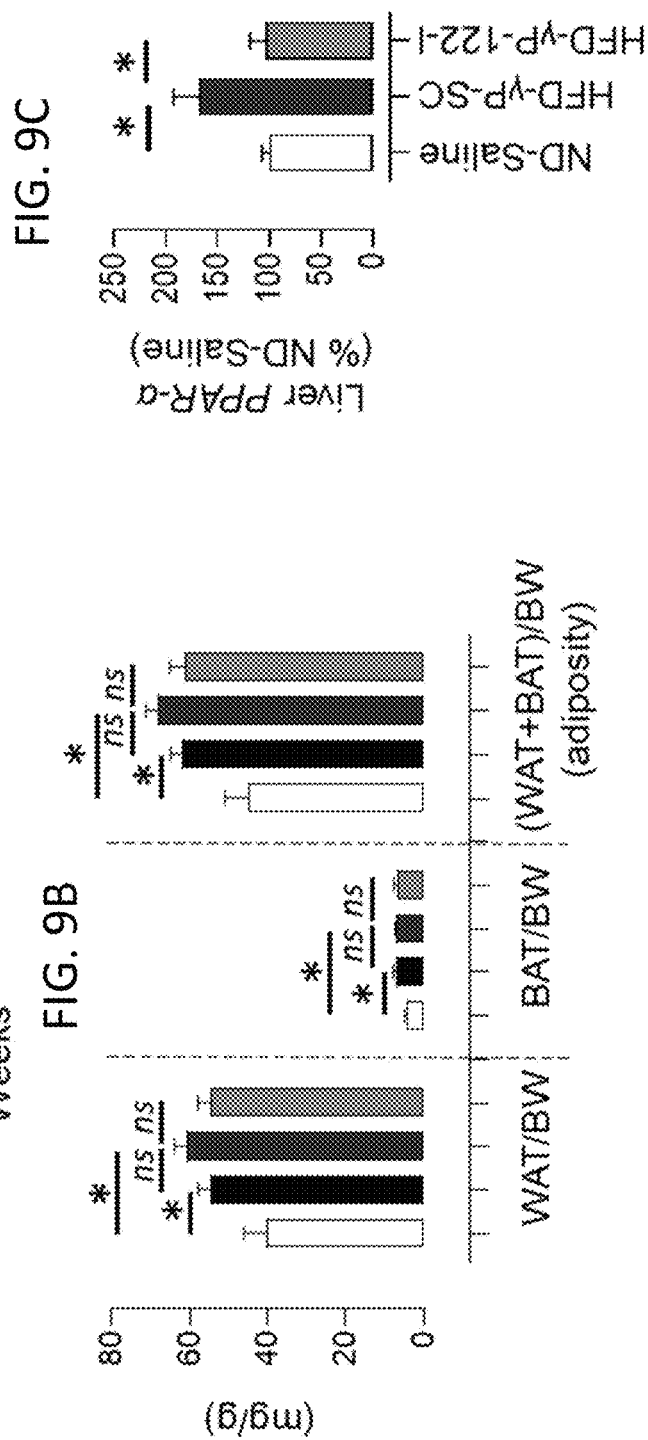

SEQUENCE LISTING

```
Sequence total quantity: 4
SEQ ID NO: 1            moltype = DNA  length = 22
FEATURE                 Location/Qualifiers
source                  1..22
                        mol_type = other DNA
                        organism = synthetic construct
modified_base           1..22
                        mod_base = OTHER
                        note = N-(2-aminoethyl) glycine
SEQUENCE: 1
acctcacact ggtaccacaa ac                                             22

SEQ ID NO: 2            moltype = DNA  length = 22
FEATURE                 Location/Qualifiers
source                  1..22
                        mol_type = other DNA
                        organism = synthetic construct
modified_base           1..22
                        mod_base = OTHER
                        note =
                         (
amino)ac
                          etic acid
SEQUENCE: 2
acctcacact ggtaccacaa ac                                             22

SEQ ID NO: 3            moltype = AA  length = 7
FEATURE                 Location/Qualifiers
source                  1..7
                        mol_type = protein
                        organism = synthetic construct
SEQUENCE: 3
VHPKQHR                                                               7

SEQ ID NO: 4            moltype = AA  length = 13
FEATURE                 Location/Qualifiers
source                  1..13
                        mol_type = protein
                        organism = synthetic construct
SEQUENCE: 4
VHPKQHRQQS KQC                                                       13
```

METHODS AND COMPOSITIONS COMPRISING THERAPEUTIC GAMMA PEPTIDE NUCLEIC ACID-BASED MOLECULES

CROSS-REFERENCE TO RELATED APPLICATIONS

This application claims the benefit of priority under 35 U.S.C. § 119(e) of U.S. Provisional Application No. 63/307,340, filed Feb. 7, 2022, the content of which is incorporated herein by reference in its entirety.

STATEMENT REGARDING FEDERALLY SPONSORED RESEARCH OR DEVELOPMENT

Not applicable.

SEQUENCE LISTING

A Sequence Listing accompanies this application and is submitted as an xml file of the sequence listing named "139766_00109.xml" which is 5,771 bytes in size and was created on Feb. 7, 2023. The sequence listing is electronically submitted via Patent Center and is incorporated herein by reference in its entirety.

BACKGROUND

Hypertension is a common impediment in patients with type 2 diabetes, and both diabetes and hypertension are individually associated with increased risk of cardiovascular events.[1] Patient with diabetes are at higher risk of non-dipping hypertension[2-4] and heart/kidney failure.[5-12] Current treatment approaches fail to decrease unwanted cardiovascular outcomes in these patients.[13-14] In patients with diabetes, the risk of hypertension is preceded and predicted by endothelial dysfunction.[15]

SUMMARY

In an aspect of the current disclosure, compositions are provided. In some embodiments, the compositions comprise a γ-PNA oligomer, the oligomer comprising a nucleic acid sequence complementary to miR-122. In some embodiments, the γ-PNA oligomer comprises a γ-diethylene glycol moiety. In some embodiments, the nucleic acid sequence comprises SEQ ID NO: 1: ACC TCA CAC TGG TAC CAC AAA C. In some embodiments, the compositions comprise one or more lysines flanking the γ-PNA oligomer.

In some embodiments the compositions comprise, from N terminus to C terminus:

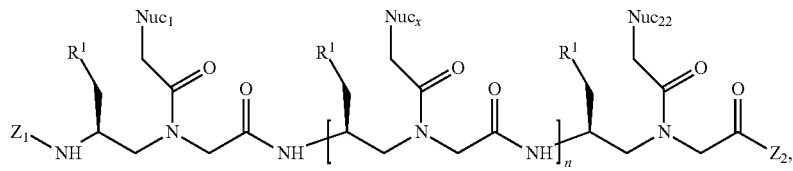

wherein $R^1$ is diethylene glycol; n is 19; $Nuc_1$, $Nuc_x$, and $Nuc_{22}$ are nucleic acids selected from adenine, thymine, guanine and cytosine, wherein x is ascending integers from 2-22 and, wherein, the sequence of $Nuc_{1-22}$ corresponds to the nucleic acid sequence ACC TCA CAC TGG TAC CAC AAA C (SEQ ID NO: 1); and $Z_1$ and $Z_2$ are independently 1-5 lysines attached linearly by amide bonds.

In another aspect of the current disclosure, pharmaceutical compositions are provided. In some embodiments, the pharmaceutical compositions comprise a γ-PNA oligomer, the oligomer comprising a nucleic acid sequence complementary to miR-122; and at least one pharmaceutical excipient or carrier. In some embodiments, the γ-PNA oligomer comprises a γ-diethylene glycol moiety. In some embodiments, the nucleic acid sequence comprises SEQ ID NO: 1: ACC TCA CAC TGG TAC CAC AAA C. In some embodiments, the compositions comprise one or more lysines flanking the γ-PNA oligomer. In some embodiments, the pharmaceutical compositions comprise an additional active agent.

In some embodiments, the pharmaceutical composition comprises from N terminus to C terminus:

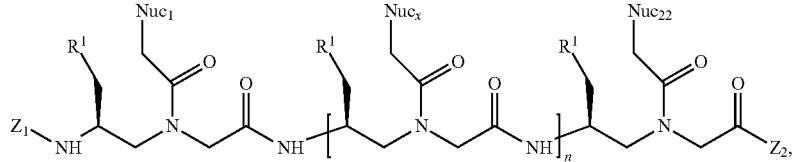

wherein $R^1$ is diethylene glycol; n is 19; $Nuc_1$, $Nuc_x$, and $Nuc_{22}$ are nucleic acids selected from adenine, thymine, guanine and cytosine, wherein x is ascending integers from 2-22 and, wherein, the sequence of $Nuc_{1-22}$ corresponds to the nucleic acid sequence ACC TCA CAC TGG TAC CAC AAA C (SEQ ID NO: 1); and $Z_1$ and $Z_2$ are independently 1-5 lysines attached linearly by amide bonds; and at least one pharmaceutical excipient or carrier. In some embodiments, the pharmaceutical compositions comprise an additional active agent.

In another aspect of the current disclosure, methods of treating a disease or disorder associated with aberrant miR-122 expression in a subject in need thereof are provided. In some embodiments, the method comprise: administering an effective amount of a pharmaceutical composition comprising a γ-PNA oligomer, the oligomer comprising a nucleic acid sequence complementary to miR-122; and at least one pharmaceutical excipient or carrier to the subject to treat the disease or disorder. In some embodiments, the γ-PNA oligomer comprises a γ-diethylene glycol moiety. In some embodiments, the nucleic acid sequence comprises SEQ ID NO: 1: ACC TCA CAC TGG TAC CAC AAA C. In some embodiments, the compositions comprise one or more lysines flanking the γ-PNA oligomer. In some embodiments, the pharmaceutical compositions comprise an additional active agent.

In some embodiments, the pharmaceutical composition comprises from N terminus to C terminus:

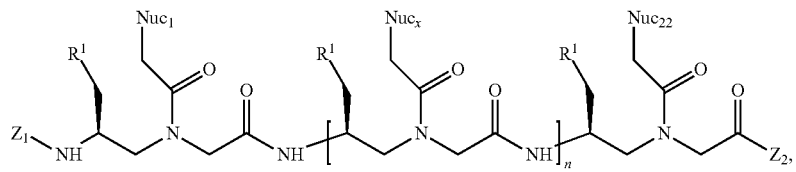

wherein $R^1$ is diethylene glycol; n is 19; $Nuc_1$, $Nuc_x$, and $Nuc_{22}$ are nucleic acids selected from adenine, thymine, guanine and cytosine, wherein x is ascending integers from 2-22 and, wherein, the sequence of $Nuc_{1-22}$ corresponds to the nucleic acid sequence ACC TCA CAC TGG TAC CAC AAA C (SEQ ID NO: 1); and $Z_1$ and $Z_2$ are independently 1-5 lysines attached linearly by amide bonds; and at least one pharmaceutical excipient or carrier. In some embodiments, the disease or disorder associated with aberrant miR-122 expression is selected from type 2 diabetes, obesity, and hypertension. In some embodiments, the disease or disorder is type 2 diabetes. In some embodiments, administration comprises oral, nasal, topical, or parenteral administration.

In another aspect of the current disclosure, methods to lower the risk or severity of a cardiovascular event in a subject in need thereof are provided. In some embodiments, the methods comprise: administering an effective amount of a compound that inhibits miR-122 to the subject. In some embodiments, a subject in need thereof comprises a subject diagnosed with one or more of type 2 diabetes, obesity, and hypertension, and/or an increased blood level of miR-122. In some embodiments, the compound that inhibits miR-122 comprises an oligomer, the oligomer comprising a nucleobase sequence complementary to miR-122, and comprising at least one PNA monomer. In some embodiments, the at least one PNA monomer comprises a γ-PNA. In some embodiments, the at least one PNA monomer comprises a γ-diethylene glycol-modified γPNA. In some embodiments, the nucleobase sequence comprises SEQ ID NO: 1: ACC TCA CAC TGG TAC CAC AAA C. In some embodiments, the compound that inhibits miR-122 comprises, from N terminus to C terminus:

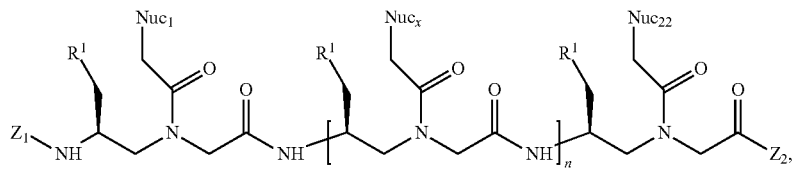

wherein $R^1$ is diethylene glycol; n is 23; $Nuc_1$, $Nuc_x$, and $Nuc_{25}$ are nucleic acids selected from adenine, thymine, guanine and cytosine, wherein x is ascending integers from 2-24 and, wherein, the sequence of $Nuc_{1-25}$ corresponds to the nucleic acid sequence ACC TCA CAC TGG TAC CAC AAA C (SEQ ID NO: 1); and $Z_1$ and $Z_2$ are independently 1-5 lysines attached linearly by amide bonds.

In another aspect of the current disclosure further compositions are provided. In some embodiments, the compositions comprising a γ-PNA oligomer, the oligomer comprising a nucleic acid sequence complementary to miR-122 and a targeting peptide. In some embodiments, the targeting peptide comprises SEQ ID NO: 3. In some embodiments, the targeting peptide comprises SEQ ID NO: 4. In some embodiments, the targeting peptide is linked to the γ-PNA oligomer linearly by amide bond.

BRIEF DESCRIPTION OF THE FIGURES

FIGS. 2A, 2B, 2C, 2D, 2E, 2F, and 2G. Effects of γP-122-I on the expression of HIF-1a. (A-C) Effects of 3-day application of a C-122-I and γP-122-I at 62.5 nmol·kg$^{-1}$ (0.25 mg·kg$^{-1}$ and 0.5 mg·kg$^{-1}$, respectively) on HIF-1α expression in the kidney (A & B) and liver (A & C). n=3-4, ×20 fields. (D) Effects of 14-day administration of γP-122-I (1.25 μmol·kg$^{-1}$) on HIF-1α expression in the aorta, kidney, and liver. (E-G) Quantification of HIF-1α in aorta (E), kidney (F), and liver (G). n=3-9, ×20 fields. *p<0.05, p<0.01, *p<0.001 vs. indicated group. Scale bar represents 20 μm. Data shown as mean and error bars represent s.e.m.

FIGS. 9A, 9B, and 9C. Effects of γP-122-I on body weight, adiposity, and hepatic PPAR-α. (A) Effect of HFD feeding and γP-122-I on the body-weight of mice. n=5. (B) Effects of HFD feeding and γP-122-I treatment on adiposity. n=5. (C) Effect of HFD feeding and γP-122-I on the PPAR-α expression in the liver. n=4-6. WAT: white adipose tissue; BAT: brown adipose tissue; BW: body weight. ns p>0.05, *p<0.05 vs. indicated group. Data are shown as mean, and the error bar represents s.e.m.

DETAILED DESCRIPTION

Figure 1D:
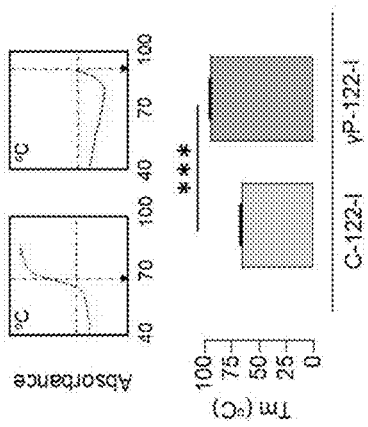
FIGS. 1A, 1B, 1C, and 1D. Binding of γ-diethylene glycol-modified γP-122-I to miR-122. (A) Chemical structures of DNA, PNA, and γPNA oligomers containing nucleobases (A, T, and C). In γPNA, the diethylene glycol group is included at the γ position. (B) Sequences of miR-122-5p, γP-122-I, and γP-SC. All nucleobases in γP-122-I and γP-SC were γ modified. (C) Gel-shift assay assessing miR-122 (1 μM) binding by γP-122-I over a range of concentrations. Bands were visualized using SyBr gold stain. (D) The melting temperatures (Tm) of heteroduplexes of miR-122 with C-122-I and γP-122-I. The panels above show the typical melting curves for each. n=3. ***p<0.001 vs. C-122-I. Data are shown as mean, and the error bars represent s.e.m.

The present invention is described herein using several definitions, as set forth below and throughout the application.

Definitions

The disclosed subject matter may be further described using definitions and terminology as follows. The definitions and terminology used herein are for the purpose of describing particular embodiments only and are not intended to be limiting.

As used in this specification and the claims, the singular forms "a," "an," and "the" include plural forms unless the context clearly dictates otherwise. For example, the term "a substituent" should be interpreted to mean "one or more substituents," unless the context clearly dictates otherwise.

As used herein, "about", "approximately," "substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean up to plus or minus 10% of the particular term and "substantially" and "significantly" will mean more than plus or minus 10% of the particular term.

As used herein, the terms "include" and "including" have the same meaning as the terms "comprise" and "comprising." The terms "comprise" and "comprising" should be interpreted as being "open" transitional terms that permit the inclusion of additional components further to those components recited in the claims. The terms "consist" and "consisting of" should be interpreted as being "closed" transitional terms that do not permit the inclusion of additional components other than the components recited in the claims. The term "consisting essentially of" should be interpreted to be partially closed and allowing the inclusion only of additional components that do not fundamentally alter the nature of the claimed subject matter.

The phrase "such as" should be interpreted as "for example, including." Moreover, the use of any and all exemplary language, including but not limited to "such as", is intended merely to better illuminate the invention and does not pose a limitation on the scope of the invention unless otherwise claimed.

Furthermore, in those instances where a convention analogous to "at least one of A, B and C, etc." is used, in general such a construction is intended in the sense of one having ordinary skill in the art would understand the convention (e.g., "a system having at least one of A, B and C" would include but not be limited to systems that have A alone, B alone, C alone, A and B together, A and C together, B and C together, and/or A, B, and C together.). It will be further understood by those within the art that virtually any disjunctive word and/or phrase presenting two or more alternative terms, whether in the description or figures, should be understood to contemplate the possibilities of including one of the terms, either of the terms, or both terms. For example, the phrase "A or B" will be understood to include the possibilities of "A" or "B" or "A and B."

All language such as "up to," "at least," "greater than," "less than," and the like, include the number recited and refer to ranges which can subsequently be broken down into ranges and subranges. A range includes each individual member. Thus, for example, a group having 1-3 members refers to groups having 1, 2, or 3 members. Similarly, a group having 6 members refers to groups having 1, 2, 3, 4, or 6 members, and so forth.

The modal verb "may" refers to the preferred use or selection of one or more options or choices among the several described embodiments or features contained within the same. Where no options or choices are disclosed regarding a particular embodiment or feature contained in the same, the modal verb "may" refers to an affirmative act regarding how to make or use and aspect of a described embodiment or feature contained in the same, or a definitive decision to use a specific skill regarding a described embodiment or feature contained in the same. In this latter context, the modal verb "may" has the same meaning and connotation as the auxiliary verb "can."

A "subject in need thereof" as utilized herein may refer to a subject in need of treatment for a disease or disorder associated with aberrant microRNA 122 (miR-122) activity and/or expression. A subject in need thereof may include a subject suffering from, for example, one or more of: type 2 diabetes, obesity, or hypertension. In some embodiments, a subject in need thereof comprises a subject suffering from one or more of type 2 diabetes, obesity, or hypertension, and having aberrant levels or activity of miR-122. In some embodiments, a subject in need thereof comprises a subject having aberrant levels or activity (e.g., higher or increased as compared to a control or normal level) of miR-122. In some embodiments, a subject in need thereof is at elevated risk for an adverse cardiovascular event due to a pre-existing condition (e.g., one or more of type 2 diabetes, obesity, or hypertension), accompanied by aberrant (e.g., elevated) levels or activity of miR-122. In some embodiments, a subject in need thereof comprises a subject that has been diagnosed with aberrant miR-122 expression which may be associated, for example, with non-alcoholic fatty liver disease or liver toxicity.

The term "subject" may be used interchangeably with the terms "individual" and "patient" and includes human and non-human mammalian subjects.

The disclosed compounds, pharmaceutical compositions, and methods may be utilized to treat diseases and disorders associated with aberrant microRNA 122 (miR-122) activity and/or expression which may include, but are not limited to type 2 diabetes, obesity, and hypertension. In some embodiments, the disclosed compounds, pharmaceutical compositions, and methods may be utilized to reduce the risk of a cardiovascular event, in a subject diagnosed with or suffering from one or more of, but not limited to, type 2 diabetes, obesity, and hypertension.

The disclosed compounds may be utilized to modulate the biological activity of miR-122. The term "modulate" should be interpreted broadly to include "inhibiting" miR-122 biological activity, including the siRNA activity of miR-122.

The phrases "% sequence identity," "percent identity," or "% identity" refer to the percentage of amino acid residue matches between at least two amino acid sequences aligned using a standardized algorithm. Methods of amino acid sequence alignment are well-known. Some alignment methods take into account conservative amino acid substitutions. Such conservative substitutions, explained in more detail below, generally preserve the charge and hydrophobicity at the site of substitution, thus preserving the structure (and therefore function) of the polypeptide. Percent identity for amino acid sequences may be determined as understood in the art. (See, e.g., U.S. Pat. No. 7,396,664, which is incorporated herein by reference in its entirety). A suite of commonly used and freely available sequence comparison algorithms is provided by the National Center for Biotechnology Information (NCBI) Basic Local Alignment Search Tool (BLAST), which is available from several sources, including the NCBI, Bethesda, Md., at its website. The BLAST software suite includes various sequence analysis programs including "blastp," that is used to align a known amino acid sequence with other amino acids sequences from a variety of databases.

The terms "protein," "peptide," and "polypeptide" are used interchangeably herein and refer to a polymer of amino acid residues linked together by peptide (amide) bonds. The terms refer to a protein, peptide, or polypeptide of any size, structure, or function. Typically, a protein, peptide, or polypeptide will be at least three amino acids long. A protein, peptide, or polypeptide may refer to an individual protein or a collection of proteins. One or more of the amino acids in a protein, peptide, or polypeptide may be modified, for example, by the addition of a chemical entity such as a carbohydrate group, a hydroxyl group, a phosphate group, a farnesyl group, an isofarnesyl group, a fatty acid group, a linker for conjugation, functionalization, or other modification, etc. A protein, peptide, or polypeptide may also be a single molecule or may be a multi-molecular complex. A protein, peptide, or polypeptide may be just a fragment of a naturally occurring protein or peptide. A protein, peptide, or polypeptide may be naturally occurring, recombinant, or synthetic, or any combination thereof. A protein may comprise different domains, for example, a nucleic acid binding domain and a nucleic acid cleavage domain. In some embodiments, a protein comprises a proteinaceous part, e.g., an amino acid sequence constituting a nucleic acid binding domain.

Nucleic acids, proteins, and/or other compositions described herein may be purified. As used herein, "purified" means separate from the majority of other compounds or entities, and encompasses partially purified or substantially purified. Purity may be denoted by a weight by weight measure and may be determined using a variety of analytical techniques such as but not limited to mass spectrometry, HPLC, etc.

Polypeptide sequence identity may be measured over the length of an entire defined polypeptide sequence, for example, as defined by a particular SEQ ID number, or may be measured over a shorter length, for example, over the length of a fragment taken from a larger, defined polypeptide sequence, for instance, a fragment of at least 15, at least 20, at least 30, at least 40, at least 50, at least 70 or at least 150 contiguous residues. Such lengths are exemplary only, and it is understood that any fragment length supported by the sequences shown herein, in the tables, figures or Sequence Listing, may be used to describe a length over which percentage identity may be measured.

The terms "nucleic acid" and "nucleic acid molecule," as used herein, refer to a compound comprising a nucleobase and an acidic moiety, e.g., a nucleoside, a nucleotide, or a polymer of nucleotides. Nucleic acids generally refer to polymers comprising nucleotides or nucleotide analogs joined together through backbone linkages such as but not limited to phosphodiester bonds. Nucleic acids include deoxyribonucleic acids (DNA) and ribonucleic acids (RNA) such as messenger RNA (mRNA), transfer RNA (tRNA), etc. Typically, polymeric nucleic acids, e.g., nucleic acid molecules comprising three or more nucleotides are linear molecules, in which adjacent nucleotides are linked to each other via a phosphodiester linkage. In some embodiments, "nucleic acid" refers to individual nucleic acid residues (e.g. nucleotides and/or nucleosides). In some embodiments, "nucleic acid" refers to an oligonucleotide chain comprising three or more individual nucleotide residues. As used herein, the terms "oligonucleotide" and "polynucleotide" can be used interchangeably to refer to a polymer of nucleotides (e.g., a string of at least three nucleotides). In some embodiments, "nucleic acid" encompasses RNA as well as single and/or double-stranded DNA. Nucleic acids may be naturally occurring, for example, in the context of a genome, a transcript, an mRNA, tRNA, rRNA, siRNA, snRNA, a plasmid, cosmid, chromosome, chromatid, or other naturally occurring nucleic acid molecule. On the other hand, a nucleic acid molecule may be a non-naturally occurring molecule, e.g., a recombinant DNA or RNA, an artificial chromosome, an engineered genome, or fragment thereof, or a synthetic DNA, RNA, DNA/RNA hybrid, or include non-naturally occurring nucleotides or nucleosides. Furthermore, the terms "nucleic acid," "DNA," "RNA," and/or similar terms include nucleic acid analogs, i.e. analogs having other than a phosphodiester backbone. Nucleic acids can be purified from natural sources, produced using recombinant expression systems and optionally purified, chemically synthesized, etc. Where appropriate, e.g., in the case of chemically synthesized molecules, nucleic acids can comprise nucleoside analogs such as analogs having chemically modified bases or sugars, and backbone modifications. A nucleic acid sequence is presented in the 5' to 3' direction unless otherwise indicated. In some embodiments, a nucleic acid is or comprises natural nucleosides, (e.g. adenosine, thymidine, guanosine, cytidine, uridine, deoxyadenosine, deoxythymidine, deoxyguanosine, and deoxycytidine); nucleoside analogs (e.g., 2-aminoadenosine, 2-thiothymidine, inosine, pyrrolo-pyrimidine, 3-methyl adenosine, 5-methylcytidine, 2-aminoadenosine, C5-bromouridine, C5-fluorouridine, C5-iodouridine, C5-propynyl-uridine, C5-propynyl-cytidine, C5-methylcytidine, 2-aminoadeno sine, 7-deazaadenosine, 7-deazaguanosine, 8-oxoadenosine, 8-oxoguanosine, O(6)-methylguanine, and 2-thiocytidine); chemically modified bases; biologically modified bases (e.g., methylated bases); intercalated bases; modified sugars (e.g., 2'-fluororibose, ribose, 2'-deoxyribose, arabinose, and hexose); and/or modified phosphate groups (e.g., phosphorothioates and 5'-N-phosphoramidite linkages).

The term "hybridization", as used herein, refers to the formation of a duplex structure by two single-stranded nucleic acids due to complementary base pairing. Hybridization can occur between fully complementary nucleic acid strands or between "substantially complementary" nucleic acid strands that contain minor regions of mismatch. Conditions under which hybridization of fully complementary nucleic acid strands is strongly preferred are referred to as "stringent hybridization conditions" or "sequence-specific hybridization conditions". Stable duplexes of substantially complementary sequences can be achieved under less stringent hybridization conditions; the degree of mismatch tolerated can be controlled by suitable adjustment of the hybridization conditions. Those skilled in the art of nucleic acid technology can determine duplex stability empirically considering a number of variables including, for example, the length and base pair composition of the oligonucleotides, ionic strength, and incidence of mismatched base pairs, following the guidance provided by the art (see, e.g., Sambrook et al., 1989, Molecular Cloning—A Laboratory Manual, Cold Spring Harbor Laboratory, Cold Spring Harbor, New York; Wetmur, 1991, Critical Review in Biochem. and Mol. Biol. 26(3/4):227-259; and Owczarzy et al., 2008, Biochemistry, 47: 5336-5353, which are incorporated herein by reference).

Chemical Entities

Chemical entities and the use thereof may be disclosed herein and may be described using terms known in the art and defined herein.

The term "alkyl" as used herein refers to a saturated straight or branched hydrocarbon, such as a straight or branched group of 1-12, 1-10, or 1-6 carbon atoms, referred to herein as $C_1$-$C_{12}$ alkyl, $C_1$-$C_{10}$-alkyl, and $C_1$-$C_6$-alkyl, respectively.

The term "alkylene" refers to a diradical of an alkyl group. An exemplary alkylene group is —$CH_2CH_2$—.

The term "haloalkyl" refers to an alkyl group that is substituted with at least one halogen, for example, —$CH_2F$, —$CHF_2$, —$CF_3$, —$CH_2CF_3$, —$CF_2CF_3$, and the like.

The term "heteroalkyl" as used herein refers to an "alkyl" group in which at least one carbon atom has been replaced with a heteroatom (e.g., an O, N, or S atom). One type of heteroalkyl group is an "alkoxyl" group.

The term "alkenyl" as used herein refers to an unsaturated straight or branched hydrocarbon having at least one carbon-carbon double bond, such as a straight or branched group of 2-12, 2-10, or 2-6 carbon atoms, referred to herein as $C_2$-$C_{12}$-alkenyl, $C_2$-$C_{10}$-alkenyl, and $C_2$-$C_6$-alkenyl, respectively. A "cycloalkene" is a compound having a ring structure (e.g., of 3 or more carbon atoms) and comprising at least one double bond.

The term "alkynyl" as used herein refers to an unsaturated straight or branched hydrocarbon having at least one carbon-carbon triple bond, such as a straight or branched group of 2-12, 2-10, or 2-6 carbon atoms, referred to herein as $C_2$-$C_{12}$-alkynyl, $C_2$-$C_{10}$-alkynyl, and $C_2$-$C_6$-alkynyl, respectively.

The term "cycloalkyl" refers to a monovalent saturated cyclic, bicyclic, or bridged cyclic (e.g., adamantyl) hydrocarbon group of 3-12, 3-8, 4-8, or 4-6 carbons, referred to herein, e.g., as "$C_{4-8}$-cycloalkyl," derived from a cycloalkane. Unless specified otherwise, cycloalkyl groups are optionally substituted at one or more ring positions with, for example, alkanoyl, alkoxy, alkyl, haloalkyl, alkenyl, alkynyl, amido, amidino, amino, aryl, arylalkyl, azido, carbamate, carbonate, carboxy, cyano, cycloalkyl, ester, ether, formyl, halogen, haloalkyl, heteroaryl, heterocyclyl, hydroxyl, imino, ketone, nitro, phosphate, phosphonato, phosphinato, sulfate, sulfide, sulfonamido, sulfonyl or thiocarbonyl. In certain embodiments, the cycloalkyl group is not substituted, i.e., it is unsubstituted.

The term "cycloalkylene" refers to a diradical of a cycloalkyl group.

The term "partially unsaturated carbocyclyl" refers to a monovalent cyclic hydrocarbon that contains at least one double bond between ring atoms where at least one ring of the carbocyclyl is not aromatic. The partially unsaturated carbocyclyl may be characterized according to the number or ring carbon atoms. For example, the partially unsaturated carbocyclyl may contain 5-14, 5-12, 5-8, or 5-6 ring carbon atoms, and accordingly be referred to as a 5-14, 5-12, 5-8, or 5-6 membered partially unsaturated carbocyclyl, respectively. The partially unsaturated carbocyclyl may be in the form of a monocyclic carbocycle, bicyclic carbocycle, tricyclic carbocycle, bridged carbocycle, spirocyclic carbocycle, or other carbocyclic ring system. Exemplary partially unsaturated carbocyclyl groups include cycloalkenyl groups and bicyclic carbocyclyl groups that are partially unsaturated. Unless specified otherwise, partially unsaturated carbocyclyl groups are optionally substituted at one or more ring positions with, for example, alkanoyl, alkoxy, alkyl, haloalkyl, alkenyl, alkynyl, amido, amidino, amino, aryl, arylalkyl, azido, carbamate, carbonate, carboxy, cyano, cycloalkyl, ester, ether, formyl, halogen, haloalkyl, heteroaryl, heterocyclyl, hydroxyl, imino, ketone, nitro, phosphate, phosphonato, phosphinato, sulfate, sulfide, sulfonamido, sulfonyl or thiocarbonyl. In certain embodiments, the partially unsaturated carbocyclyl is not substituted, i.e., it is unsubstituted.

The term "aryl" is art-recognized and refers to a carbocyclic aromatic group. Representative aryl groups include phenyl, naphthyl, anthracenyl, and the like. The term "aryl" includes polycyclic ring systems having two or more carbocyclic rings in which two or more carbons are common to two adjoining rings (the rings are "fused rings") wherein at least one of the rings is aromatic and, e.g., the other ring(s) may be cycloalkyls, cycloalkenyls, cycloalkynyls, and/or aryls. Unless specified otherwise, the aromatic ring may be substituted at one or more ring positions with, for example, halogen, azide, alkyl, aralkyl, alkenyl, alkynyl, cycloalkyl, hydroxyl, alkoxyl, amino, nitro, sulfhydryl, imino, amido, carboxylic acid, —C(O)alkyl, —CO₂alkyl, carbonyl, carboxyl, alkylthio, sulfonyl, sulfonamido, sulfonamide, ketone, aldehyde, ester, heterocyclyl, aryl or heteroaryl moieties, —CF₃, —CN, or the like. In certain embodiments, the aromatic ring is substituted at one or more ring positions with halogen, alkyl, hydroxyl, or alkoxyl. In certain other embodiments, the aromatic ring is not substituted, i.e., it is unsubstituted. In certain embodiments, the aryl group is a 6-10 membered ring structure.

The terms "heterocyclyl" and "heterocyclic group" are art-recognized and refer to saturated, partially unsaturated, or aromatic 3- to 10-membered ring structures, alternatively 3- to 7-membered rings, whose ring structures include one to four heteroatoms, such as nitrogen, oxygen, and sulfur. The number of ring atoms in the heterocyclyl group can be specified using 5 $C_X$-$C_X$ nomenclature where x is an integer specifying the number of ring atoms. For example, a $C_3$-$C_7$ heterocyclyl group refers to a saturated or partially unsaturated 3- to 7-membered ring structure containing one to four heteroatoms, such as nitrogen, oxygen, and sulfur. The designation "$C_3$-$C_7$" indicates that the heterocyclic ring contains a total of from 3 to 7 ring atoms, inclusive of any heteroatoms that occupy a ring atom position.

The terms "amine" and "amino" are art-recognized and refer to both unsubstituted and substituted amines, wherein substituents may include, for example, alkyl, cycloalkyl, heterocyclyl, alkenyl, and aryl.

The terms "alkoxyl" or "alkoxy" are art-recognized and refer to an alkyl group, as defined above, having an oxygen radical attached thereto. Representative alkoxyl groups include methoxy, ethoxy, tert-butoxy and the like.

An "ether" is two hydrocarbons covalently linked by an oxygen. Accordingly, the substituent of an alkyl that renders that alkyl an ether is or resembles an alkoxyl, such as may be represented by one of —O-alkyl, —O-alkenyl, —O-alkynyl, and the like.

The term "carbonyl" as used herein refers to the radical —C(O)—.

The term "carboxy" or "carboxyl" as used herein refers to the radical —COOH or its corresponding salts, e.g. —COONa, etc.

The term "amide" or "amido" or "carboxamido" as used herein refers to a radical of the form —R¹C(O)N(R²)—, —R¹C(O)N(R²)R³—, —C(O)NR²R³, or —C(O)NH₂, wherein R¹, R² and R³ are each independently alkoxy, alkyl, alkenyl, alkynyl, amide, amino, aryl, arylalkyl, carbamate, cycloalkyl, ester, ether, formyl, halogen, haloalkyl, heteroaryl, heterocyclyl, hydrogen, hydroxyl, ketone, or nitro.

The compounds of the disclosure may contain one or more chiral centers and/or double bonds and, therefore, exist as stereoisomers, such as geometric isomers, enantiomers or diastereomers. The term "stereoisomers" when used herein consist of all geometric isomers, enantiomers or diastereomers. These compounds may be designated by the symbols "R" or "S," depending on the configuration of substituents around the stereogenic carbon atom. The present invention encompasses various stereo isomers of these compounds and mixtures thereof. Stereoisomers include enantiomers and diastereomers. Mixtures of enantiomers or diastereomers may be designated "(±)" in nomenclature, but the skilled artisan will recognize that a structure may denote a chiral center implicitly. It is understood that graphical depictions of chemical structures, e.g., generic chemical structures, encompass all stereoisomeric forms of the specified compounds, unless indicated otherwise.

γ Peptide Nucleic Acid-Based Molecules

Disclosed herein are compounds, pharmaceutical compositions comprising the compounds, and methods of using the compounds and pharmaceutical compositions for treating a subject having or at risk for developing a disease or disorder associated with microRNA 122 (miR-122) biological activity. The disclosed compounds may inhibit the biological activity of miR-122. As such, the disclosed compounds and pharmaceutical compositions may be utilized in methods for treating a subject having or at risk for developing a disease or disorder that is associated with miR-122 activity which may be, for example, type 2 diabetes, obesity, and hypertension.

By way of example but not by way of limitation, in some embodiments, a subject diagnosed with one or more of type 2 diabetes, obesity, and hypertension is treated with a pharmaceutical composition of the present disclosure to reduce the risk of an adverse cardiovascular event. Such reduced risk is evidenced in the subject by observing, after treatment, one or more of decreased blood pressure, decrease blood glucose level, reduction in body weight, decreased blood level of miR-122, decreased blood level of TNF-α, as compared to levels before treatment, or as compared to an appropriately matched untreated control.

In some embodiments, a subject in need thereof is diagnosed with a condition associated with aberrant miR-122 expression including, for example, non-alcoholic fatty liver disease or liver toxicity, e.g., acute liver toxicity or chronic liver toxicity.

In one aspect of the current invention, γ-peptide nucleic acids (γ-PNAs) are disclosed. In some embodiments, the γ-PNA oligomers comprise a nucleic acid sequence complementary to miR-122.

Figure 1B:
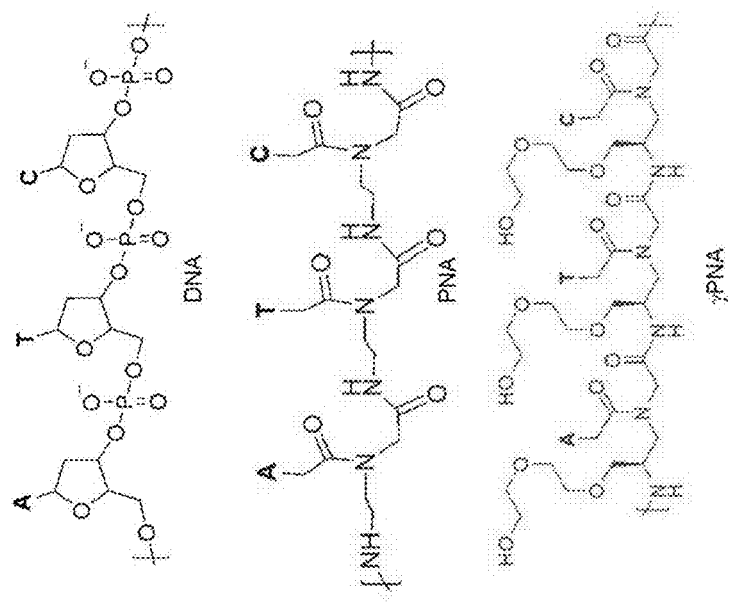
Figure 1C:
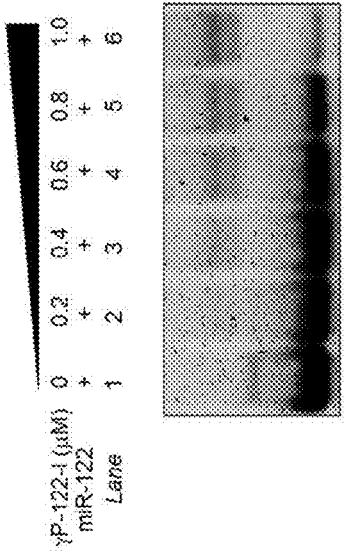
Figure 1A:
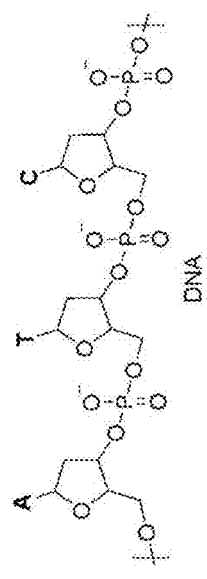

As used herein, "peptide nucleic acids" refer to synthetic DNA analogs in which the phosphodiester backbone is replaced by repetitive units of N-(2-aminoethyl) glycine to which the purine and pyrimidine bases are attached via a methyl carbonyl linker (FIG. 1A). The procedures for PNA synthesis are similar to those employed for peptide synthesis, using standard solid-phase manual or automated synthesis. The synthetic backbone provides PNA with unique hybridization characteristics. Unlike DNA and RNA, the PNA backbone is not charged. Consequently, there is no electrostatic repulsion when PNAs hybridize to a target nucleic acid sequence, giving a higher stability to the PNA-DNA or PNA-RNA duplexes than the natural homo- or heteroduplexes. This greater stability is reflected by a higher thermal melting temperature (Tm), as compared to the corresponding DNA-DNA or DNA-RNA duplexes. PNA oligomers, like DNA oligomers, comprise a nucleic acid sequence defined by the bases adenine (A), guanine (G), thymine (T), cytosine (C), and uracil (U). The compositions of the present disclosure are not limited to naturally occurring bases, and non-natural bases or modified bases may also be used.

As used herein "γPNA" refer to a PNA monomer comprising a modification of the γ position on the 2-aminoethyl glycine backbone. Such modifications allow for further tuning of the chemical properties of the PNA to the intended application. In some embodiments, the γ position is modified by addition of diethylene glycol. In embodiments, the γ position is modified by addition of triethylene glycol or by polyethylene glycol.

As used herein the term "oligomer" refers to a chain of monomers, such as PNA monomers, and/or γPNA monomers. An oligomer may include monomers of different species (e.g., a plurality of PNA monomers, and a plurality of γPNA monomers). Such an oligomer is termed a "mixed oligomer" herein. As used herein, a "γPNA oligomer" refers to an oligomer comprising a plurality of γPNA monomers. While other moieties may be included in a γPNA monomer (e.g, amino acids, detectable labels, purification tags, etc.), the only PNA moieties in the oligomer are γPNA monomers. In some embodiments, a γPNA oligomer comprises at least one γ-diethylene glycol moiety.

In some embodiments, the nucleic acid sequence of a PNA, such as a γ-PNA, is complementary to the nucleic acid sequence of miR-122. Thus, in some embodiments, the nucleic acid sequence comprises SEQ ID NO: 1: ACC TCA CAC TGG TAC CAC AAA C.

In some embodiments, further modifications are made to the disclosed γPNA compounds that tune the chemical properties of the compound to the intended application of inhibition of miR-122. In some embodiments, the compounds comprise one or more lysines flanking the γ-PNA oligomer. As used herein, "flanking" refers to the one or more lysines being added linearly by amide bond to the 2-aminoethyl backbone. Without being bound by any theory or mechanism, it is possible that such a modification enhances the efficacy of the disclosed γPNA compounds.

In some embodiments, the compounds comprise, from N terminus to C terminus:

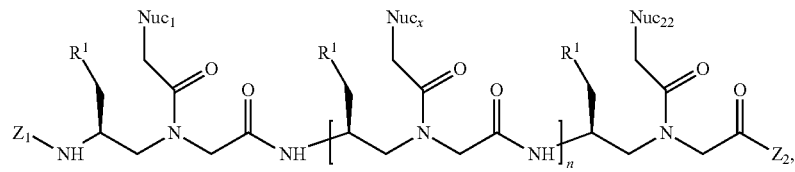

wherein $R^1$ is diethylene glycol; n is 19; $Nuc_1$, $Nuc_x$, and $Nuc_{22}$ are nucleic acids selected from adenine, thymine, guanine and cytosine, wherein x is ascending integers from 2-22 and, wherein, the sequence of $Nuc_{1-22}$ corresponds to the nucleic acid sequence ACC TCA CAC TGG TAC CAC AAA C (SEQ ID NO: 1); and $Z_1$ and $Z_2$ are independently 1-5 lysines attached linearly by amide bonds. In some embodiments, $R^1$ is triethylene glycol or polyethylene glycol.

Figure 11B:
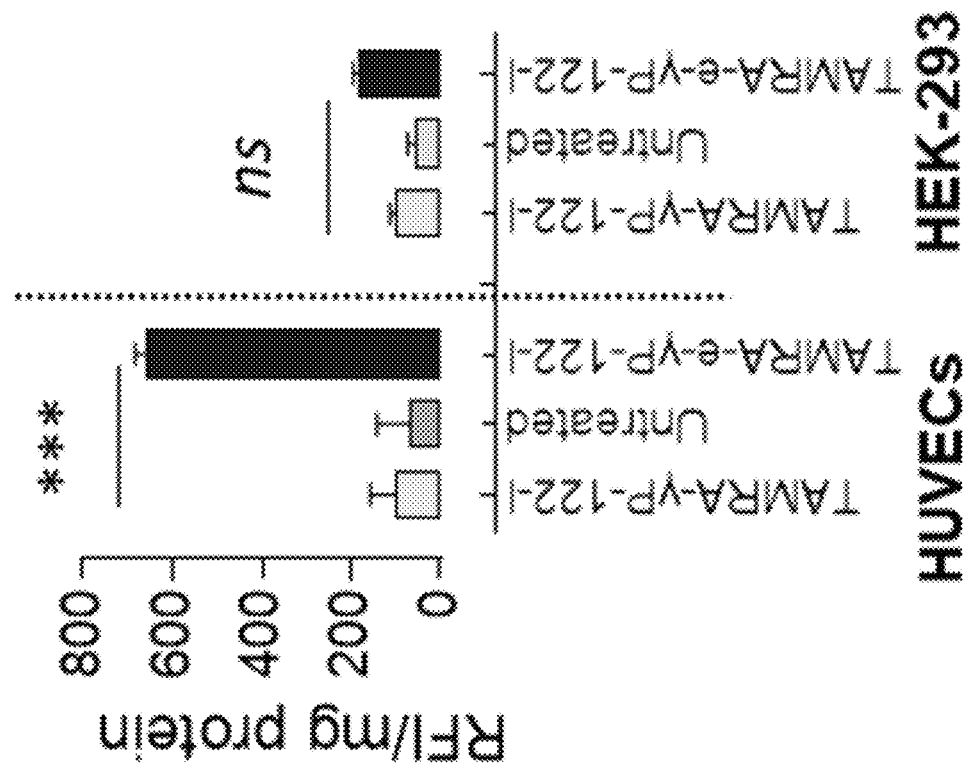
FIGS. 11A and 11B. VHPK-tagged version of γPNA targets endothelial cells. a) Purity as determined by high-performance liquid chromatography. b) Increased binding of TAMRA-e-γP-122-I to endothelial cells (HUVECs) than TAMRA-γP-122-I. For comparison, we also measured the binding of TAMRA-e-γP-122-I and TAMRA-γP-122-I to the HEK-293 cells. n=4. The cells were incubated with TAMRA-e-γP-122-I or TAMRA-γP-122-I for 30 minutes, washed three times, lysed, and the fluorescence intensity was measured and normalized to protein. RFI: Rhodamine (5-TAMRA) fluorescence intensity (561/600).

The disclosed γ-PNA compounds may further comprise a targeting peptide. The targeting peptide may, for example, target the disclosed γ-PNA compounds to endothelial cells. The targeting peptide may comprise VHPK peptide (VHPKQHR (SEQ ID NO: 3) or VHPKQHRQQSKQC (SEQ ID NO: 4)). The targeting peptide may be fused to either the N or the C terminus of the γ-PNA compounds by, e.g., amide bond, methods for which are known in the art. Alternatively, the VHPK molecule may be fused to the γ-PNA compounds by a linker protein, examples of which are known in the art. Referring now to FIG. 11B, the inventors have shown that fusing the VHPK peptide to the γ-PNA compounds increases binding of the compounds specifically to endothelial cells.

Pharmaceutical Compositions

In another aspect of the current disclosure, pharmaceutical compositions are provided. In some embodiments, the pharmaceutical compositions comprise γPNA oligomers comprising a nucleic acid sequence complementary to miR-122, and a pharmaceutically acceptable carrier or excipient. In some embodiments, the pharmaceutical compositions also comprise an additional active agent, e.g., semaglutide, metformin.

In some embodiments, the nucleic acid sequence is complementary to the nucleic acid sequence of miR-122. Thus, in some embodiments, the nucleic acid sequence comprises SEQ ID NO: 1: ACC TCA CAC TGG TAC CAC AAA C. In some embodiments, the compounds comprise one or more lysines flanking the γ-PNA oligomer. In some embodiments, the pharmaceutical compositions comprise, from N terminus to C terminus:

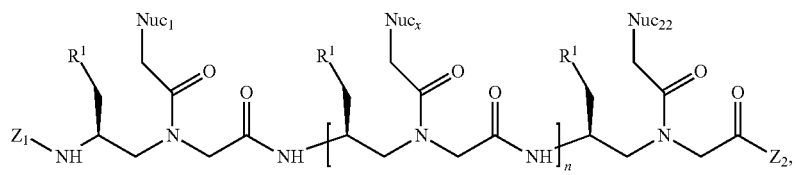

wherein $R^1$ is diethylene glycol; n is 19; $Nuc_1$, $Nuc_x$, and $Nuc_{22}$ are nucleic acids selected from adenine, thymine, guanine and cytosine, wherein x is ascending integers from 2-22 and, wherein, the sequence of $Nuc_{1-22}$ corresponds to the nucleic acid sequence ACC TCA CAC TGG TAC CAC AAA C (SEQ ID NO: 1); and $Z_1$ and $Z_2$ are independently 1-5 lysines attached linearly by amide bonds; and a pharmaceutically acceptable carrier or excipient. In some embodiments, $R^1$ is triethylene glycol or polyethylene glycol.

The compounds employed in the compositions and methods disclosed herein may be administered as pharmaceutical compositions and, therefore, pharmaceutical compositions incorporating the compounds are considered to be embodiments of the compositions disclosed herein. Such compositions may take any physical form which is pharmaceutically acceptable; illustratively, they can be orally administered pharmaceutical compositions. Such pharmaceutical compositions contain an effective amount of a disclosed compound, which effective amount is related to the daily dose of the compound to be administered. Each dosage unit may contain the daily dose of a given compound or each dosage unit may contain a fraction of the daily dose, such as one-half or one-third of the dose. The amount of each compound to be contained in each dosage unit can depend, in part, on the identity of the particular compound chosen for the therapy and other factors, such as the indication for which it is given. The pharmaceutical compositions disclosed herein may be formulated so as to provide quick, sustained, or delayed release of the active ingredient after administration to the patient by employing well known procedures.

The compounds for use according to the methods of disclosed herein may be administered as a single compound or a combination of compounds. For example, a compound that inhibits the biological activity of miR-122 may be administered as a single compound or in combination with another compound inhibits the biological activity of miR-122 or that has a different pharmacological activity.

As indicated above, pharmaceutically acceptable salts of the compounds are contemplated and also may be utilized in the disclosed methods. The term "pharmaceutically acceptable salt" as used herein, refers to salts of the compounds, which are substantially non-toxic to living organisms. Typical pharmaceutically acceptable salts include those salts prepared by reaction of the compounds as disclosed herein with a pharmaceutically acceptable mineral or organic acid or an organic or inorganic base. Such salts are known as acid addition and base addition salts. It will be appreciated by the skilled reader that most or all of the compounds as disclosed herein are capable of forming salts and that the salt forms of pharmaceuticals are commonly used, often because they are more readily crystallized and purified than are the free acids or bases.

Acids commonly employed to form acid addition salts may include inorganic acids such as hydrochloric acid, hydrobromic acid, hydroiodic acid, sulfuric acid, phosphoric acid, and the like, and organic acids such as p-toluenesulfonic, methanesulfonic acid, oxalic acid, p-bromophenylsulfonic acid, carbonic acid, succinic acid, citric acid, benzoic acid, acetic acid, and the like. Examples of suitable pharmaceutically acceptable salts may include the sulfate, pyrosulfate, bisulfate, sulfite, bisulfate, phosphate, monohydrogenphosphate, dihydrogenphosphate, metaphosphate, pyrophosphate, bromide, iodide, acetate, propionate, decanoate, caprylate, acrylate, formate, hydrochloride, dihydrochloride, isobutyrate, caproate, heptanoate, propiolate, oxalate, malonate, succinate, suberate, sebacate, fumarate, maleat-, butyne-.1,4-dioate, hexyne-1,6-dioate, benzoate, chlorobenzoate, methylbenzoate, hydroxybenzoate, methoxybenzoate, phthalate, xylenesulfonate, phenylacetate, phenylpropionate, phenylbutyrate, citrate, lactate, α-hydroxybutyrate, glycolate, tartrate, methanesulfonate, propanesulfonate, naphthalene-1-sulfonate, naphthalene-2-sulfonate, mandelate, and the like.

Base addition salts include those derived from inorganic bases, such as ammonium or alkali or alkaline earth metal hydroxides, carbonates, bicarbonates, and the like. Bases useful in preparing such salts include sodium hydroxide, potassium hydroxide, ammonium hydroxide, potassium carbonate, sodium carbonate, sodium bicarbonate, potassium bicarbonate, calcium hydroxide, calcium carbonate, and the like.

The particular counter-ion forming a part of any salt of a compound disclosed herein is may not be critical to the activity of the compound, so long as the salt as a whole is pharmacologically acceptable and as long as the counter-ion does not contribute undesired qualities to the salt as a whole. Undesired qualities may include undesirably solubility or toxicity.

Pharmaceutically acceptable esters and amides of the compounds can also be employed in the compositions and methods disclosed herein. Examples of suitable esters include alkyl, aryl, and aralkyl esters, such as methyl esters, ethyl esters, propyl esters, dodecyl esters, benzyl esters, and the like. Examples of suitable amides include unsubstituted amides, monosubstituted amides, and disubstituted amides, such as methyl amide, dimethyl amide, methyl ethyl amide, and the like.

In addition, the methods disclosed herein may be practiced using solvate forms of the compounds or salts, esters, and/or amides, thereof. Solvate forms may include ethanol solvates, hydrates, and the like.

The pharmaceutical compositions may be utilized in methods of treating a disease or disorder associated with the biological activity of miR-122. As used herein, the terms "treating" or "to treat" each mean to alleviate symptoms, eliminate the causation of resultant symptoms either on a temporary or permanent basis, and/or to prevent or slow the appearance or to reverse the progression or severity of resultant symptoms of the named disease or disorder. As such, the methods disclosed herein encompass both therapeutic and prophylactic administration. By way of example, a treated subject may be at reduced risk for a cardiovascular event, or treatment may lessen the severity of a cardiovascular disorder or potential cardiovascular disorder.

As used herein the term "effective amount" refers to the amount or dose of the compound, upon single or multiple dose administration to the subject, which provides the desired effect in the subject under diagnosis or treatment. The disclosed methods may include administering an effective amount of the disclosed compounds (e.g., as present in a pharmaceutical composition) for treating a disease or disorder associated with biological activity of miR-122. By way of example but not by way of limitation, in some embodiments an effective amount is sufficient to result in one or more of decreased blood pressure, decrease blood glucose level, reduction in body weight, decreased blood level of miR-122, decreased blood level of TNF-α in the subject after treatment, as compared to the subject before treatment, or compared to an appropriately matched, untreated control. In some embodiments, an effective amount is sufficient to result in one or more of: improved glycemic control and improved vascular dysfunction.

As used herein, "cardiovascular event," or "adverse cardiovascular event" refers to incidents, disease, or conditions that may cause damage to the heart muscle, including but not limited to heart failure, atrial fibrillation, enlarged left heart, heart arrhythmias, heart attack, heart valve disease, carotid or coronary artery disease.

An effective amount can be readily determined by the attending diagnostician, as one skilled in the art, by the use of known techniques and by observing results obtained under analogous circumstances. In determining the effective amount or dose of compound administered, a number of factors can be considered by the attending diagnostician, such as: the species of the subject; its size, age, and general health; the degree of involvement or the severity of the disease or disorder involved; the response of the individual subject; the particular compound administered; the mode of administration; the bioavailability characteristics of the preparation administered; the dose regimen selected; the use of concomitant medication; and other relevant circumstances.

A typical daily dose may contain from about 0.01 mg/kg to about 100 mg/kg (such as from about 0.05 mg/kg to about 50 mg/kg and/or from about 0.1 mg/kg to about 25 mg/kg) of each compound used in the present method of treatment.

Compositions can be formulated in a unit dosage form, each dosage containing from about 1 to about 500 mg of each compound individually or in a single unit dosage form, such as from about 5 to about 300 mg, from about 10 to about 100 mg, and/or about 25 mg. The term "unit dosage form" refers to a physically discrete unit suitable as unitary dosages for a patient, each unit containing a predetermined quantity of active material calculated to produce the desired therapeutic effect, in association with a suitable pharmaceutical carrier, diluent, or excipient.

Oral administration is an illustrative route of administering the compounds employed in the compositions and methods disclosed herein. Other illustrative routes of administration include transdermal, percutaneous, intravenous, intramuscular, intranasal, buccal, intrathecal, intracerebral, or intrarectal routes. The route of administration may be varied in any way, limited by the physical properties of the compounds being employed and the convenience of the subject and the caregiver.

As one skilled in the art will appreciate, suitable formulations include those that are suitable for more than one route of administration. For example, the formulation can be one that is suitable for both intrathecal and intracerebral administration. Alternatively, suitable formulations include those that are suitable for only one route of administration as well as those that are suitable for one or more routes of administration, but not suitable for one or more other routes of administration. For example, the formulation can be one that is suitable for oral, transdermal, percutaneous, intravenous, intramuscular, intranasal, buccal, and/or intrathecal administration but not suitable for intracerebral administration.

The inert ingredients and manner of formulation of the pharmaceutical compositions are conventional. The usual methods of formulation used in pharmaceutical science may be used here. All of the usual types of compositions may be used, including tablets, chewable tablets, capsules, solutions, parenteral solutions, intranasal sprays or powders, troches, suppositories, transdermal patches, and suspensions. In general, compositions contain from about 0.5% to about 50% of the compound in total, depending on the desired doses and the type of composition to be used. The amount of the compound, however, is best defined as the "effective amount", that is, the amount of the compound which provides the desired dose to the patient in need of such treatment. The activity of the compounds employed in the compositions and methods disclosed herein are not believed to depend greatly on the nature of the composition, and, therefore, the compositions can be chosen and formulated primarily or solely for convenience and economy.

Capsules are prepared by mixing the compound with a suitable diluent and filling the proper amount of the mixture in capsules. The usual diluents include inert powdered substances (such as starches), powdered cellulose (especially crystalline and microcrystalline cellulose), sugars (such as fructose, mannitol and sucrose), grain flours, and similar edible powders.

Tablets are prepared by direct compression, by wet granulation, or by dry granulation. Their formulations usually incorporate diluents, binders, lubricants, and disintegrators (in addition to the compounds). Typical diluents include, for example, various types of starch, lactose, mannitol, kaolin, calcium phosphate or sulfate, inorganic salts (such as sodium chloride), and powdered sugar. Powdered cellulose derivatives can also be used. Typical tablet binders include substances such as starch, gelatin, and sugars (e.g., lactose, fructose, glucose, and the like). Natural and synthetic gums can also be used, including acacia, alginates, methylcellulose, polyvinylpyrrolidine, and the like. Polyethylene glycol, ethylcellulose, and waxes can also serve as binders.

Tablets can be coated with sugar, e.g., as a flavor enhancer and sealant. The compounds also may be formulated as chewable tablets, by using large amounts of pleasant-tasting substances, such as mannitol, in the formulation. Instantly dissolving tablet-like formulations can also be employed, for example, to assure that the patient consumes the dosage form and to avoid the difficulty that some patients experience in swallowing solid objects.

A lubricant can be used in the tablet formulation to prevent the tablet and punches from sticking in the die. The lubricant can be chosen from such slippery solids as talc, magnesium and calcium stearate, stearic acid, and hydrogenated vegetable oils.

Tablets can also contain disintegrators. Disintegrators are substances that swell when wetted to break up the tablet and release the compound. They include starches, clays, celluloses, algins, and gums. As further illustration, corn and potato starches, methylcellulose, agar, bentonite, wood cellulose, powdered natural sponge, cation-exchange resins, alginic acid, guar gum, citrus pulp, sodium lauryl sulfate, and carboxymethylcellulose can be used.

Compositions can be formulated as enteric formulations, for example, to protect the active ingredient from the strongly acid contents of the stomach. Such formulations can be created by coating a solid dosage form with a film of a polymer which is insoluble in acid environments and soluble in basic environments. Illustrative films include cellulose acetate phthalate, polyvinyl acetate phthalate, hydroxypropyl methylcellulose phthalate, and hydroxypropyl methylcellulose acetate succinate.

Transdermal patches can also be used to deliver the compounds. Transdermal patches can include a resinous composition in which the compound will dissolve or partially dissolve; and a film which protects the composition, and which holds the resinous composition in contact with the skin. Other, more complicated patch compositions can also be used, such as those having a membrane pierced with a plurality of pores through which the drugs are pumped by osmotic action.

As one skilled in the art will also appreciate, the formulation can be prepared with materials (e.g., actives excipients, carriers (such as cyclodextrins), diluents, etc.) having properties (e.g., purity) that render the formulation suitable for administration to humans. Alternatively, the formulation can be prepared with materials having purity and/or other properties that render the formulation suitable for administration to non-human subjects, but not suitable for administration to humans.

Methods of Treatment

Figures 5A, 5B:
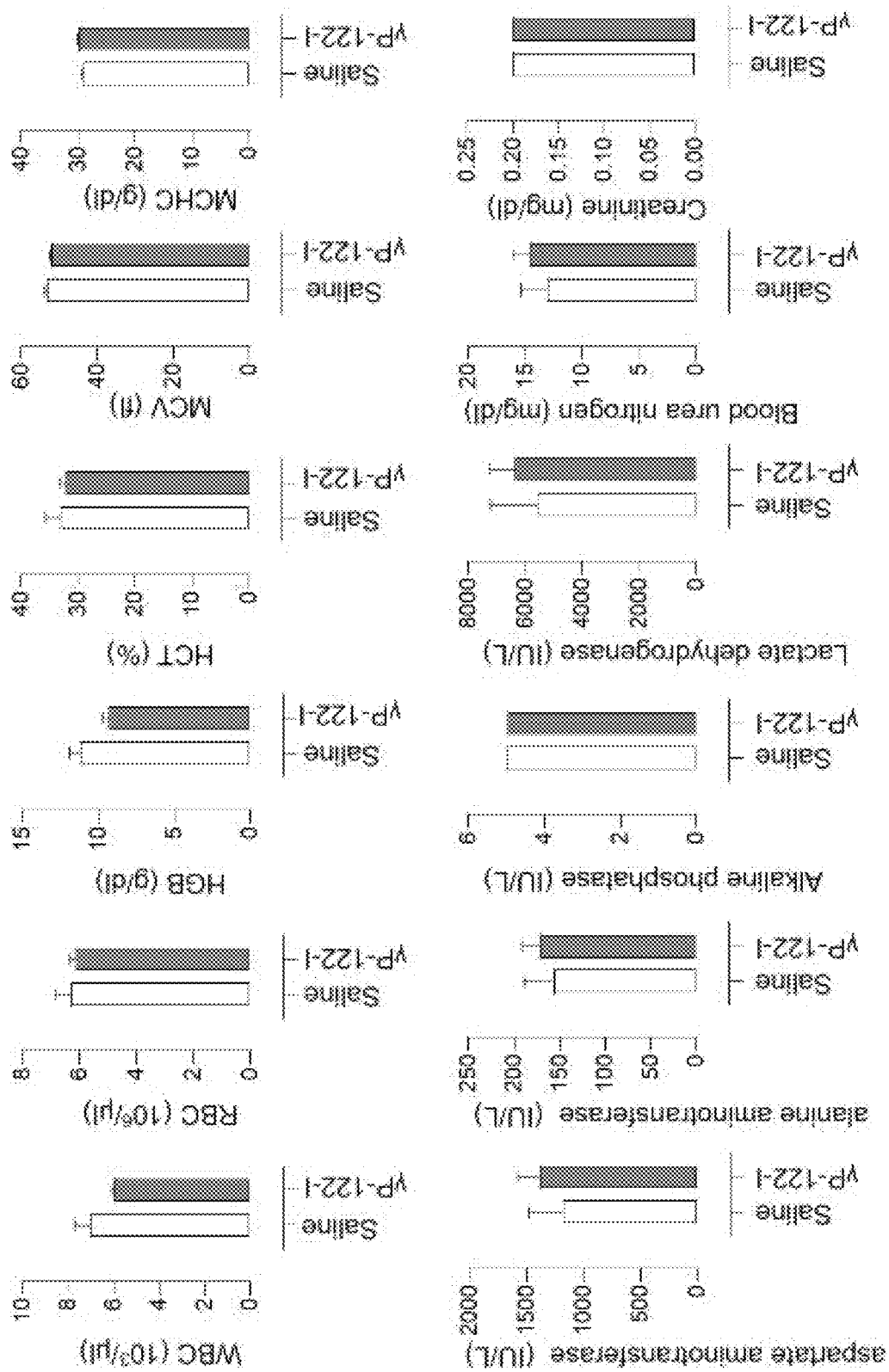
FIGS. 5A and 5B. Acute effects of γP-122-I on complete blood counts and on liver and kidney enzyme levels in the blood. (A) The white blood cells (WBC), red blood cells (RBC), hemoglobin (HGB), hematocrit (HCT), mean corpuscular volume (MCV), and mean corpuscular hemoglobin concentration (MCHC) levels in the blood of mice that had received either saline or γP-122-I, at 24 hours (0.25 μmol·kg$^{-1}$) post-administration. n=6. (B) Levels of aspartate aminotransferase (AST), alanine aminotransferase (ALT), alkaline phosphatase (AP), lactate dehydrogenase (LDH), blood urea nitrogen (BUN), and creatinine in blood from mice that had received either saline or γP-122-I at 24 hours (0.25 μmol· kg$^{-1}$) post-administration. n=6. Data are shown as mean and the error bar represents s.e.m.
Figure 6:
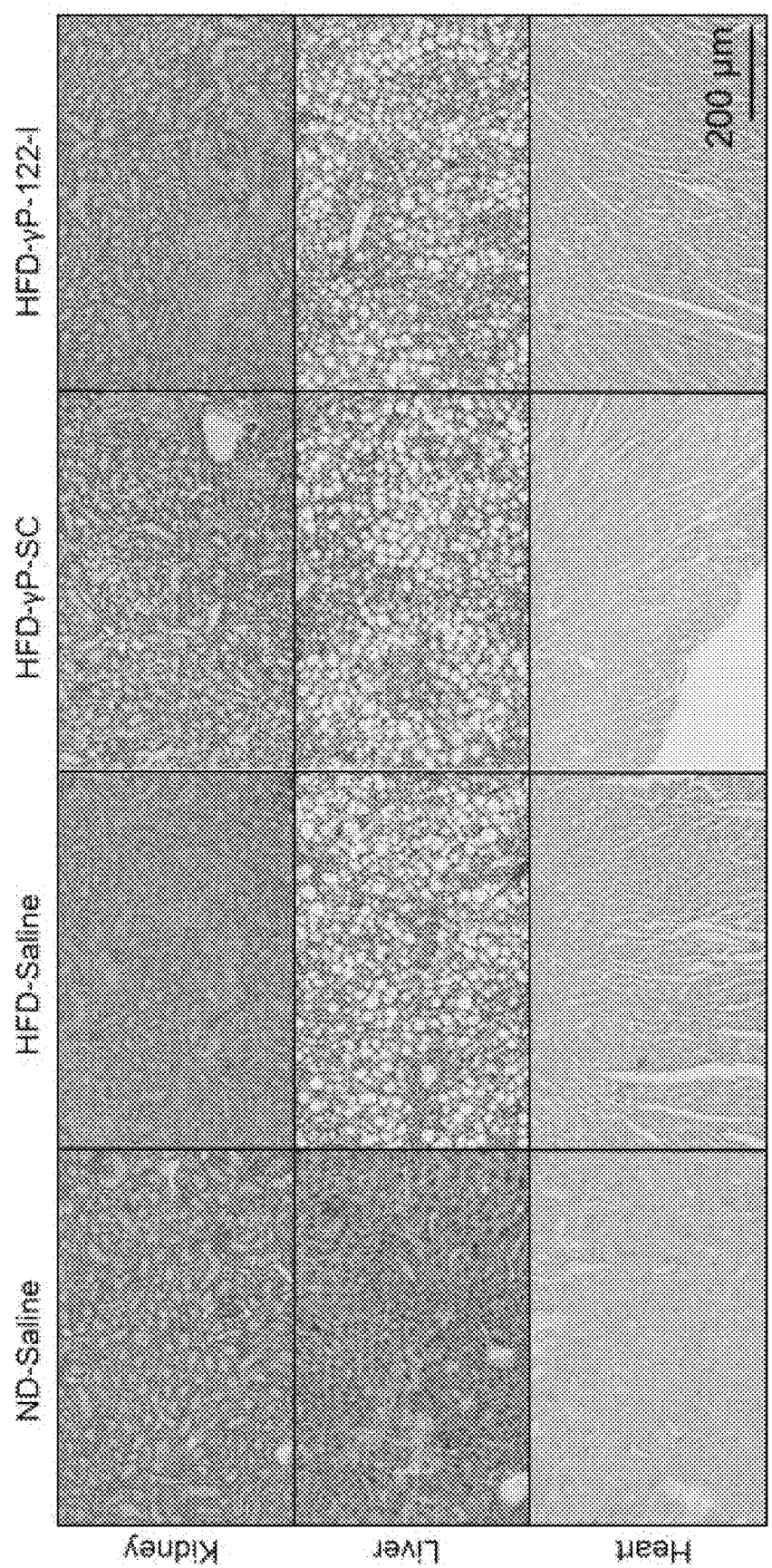
FIG. 6. Long-term effects of γP-122-I on tissue histology. Photomicrographs showing hematoxylin and eosin-stained histological sections of kidneys, livers, and hearts of ND-fed mice receiving saline, HFD-fed mice receiving saline, HFD-fed mice receiving γP-SC, and HFD-fed mice receiving γP-122-I. The mice fed a HFD for eight weeks and were treated with γP-122-I or γP-SC for six weeks (0.25 μmol·kg$^{-1}$) beginning two weeks after the dietary intervention.

The inventors disclose herein that compositions comprising γPNAs complementary to miR-122 are effective in the treatment of conditions associated with aberrant miR-122 expression. The inventors demonstrate that anti-miR-122 γPNAs rescue endothelial dysfunction in prediabetic mice (FIG. 3). Furthermore, the inventors demonstrate that both short- and long-term administration of the disclosed γPNAs does not result in adverse health effects in mice (FIGS. 5 and 6).

Therefore, in another aspect of the current disclosure, methods of treating a disease or disorder associated with aberrant miR-122 expression in a subject in need thereof are provided. In some embodiments, the methods comprise: administering an effective amount of a pharmaceutical composition comprising a γPNA oligomer comprising a nucleobase sequence complementary to miR-122, and a pharmaceutically acceptable carrier or excipient to treat the disease or disorder. In some embodiments, the pharmaceutical compositions also comprise an additional active agent. In some embodiments, the nucleic acid sequence is complementary to the nucleic acid sequence of miR-122. Thus, in some embodiments, the nucleic acid sequence comprises SEQ ID NO: 1: ACC TCA CAC TGG TAC CAC AAA C. In some embodiments, the compounds comprise one or more lysines flanking the γ-PNA oligomer. In some embodiments, the pharmaceutical compositions comprise, from N terminus to C terminus:

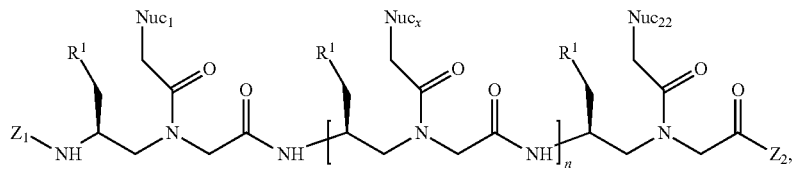

wherein $R^1$ is diethylene glycol; n is 19; $Nuc_1$, $Nuc_x$, and $Nuc_{22}$ are nucleic acids selected from adenine, thymine, guanine and cytosine, wherein x is ascending integers from 2-22 and, wherein, the sequence of $Nuc_{1-22}$ corresponds to the nucleic acid sequence ACC TCA CAC TGG TAC CAC AAA C (SEQ ID NO: 1); and $Z_1$ and $Z_2$ are independently 1-5 lysines attached linearly by amide bonds; and a pharmaceutically acceptable carrier or excipient. In some embodiments, $R^1$ is triethylene glycol or polyethylene glycol. In some embodiments, the disease or disorder associated with miR-122 expression is selected from type 2 diabetes, obesity, and hypertension.

In some embodiments, a subject in need thereof is administered a composition of the present disclosure to treat a disease or condition, or to reduce the risk or severity of a cardiovascular event. In some embodiments, a subject in need thereof is diagnosed with, suspected of having, or displays symptoms of one or more of type 2 diabetes, obesity, hypertension, or an increase in blood miRNA-122 levels, and in some embodiments, the subject is administered an miRNA-122 inhibitor to reduce the risk of a cardiovascular event, reduce the severity of a cardiovascular event, and, in some embodiments, simultaneously treat the diabetes, obesity, and/or hypertension. In some embodiments, a subject in need thereof is diagnosed with a condition associated with aberrant miR-122 expression including, for example, non-alcoholic fatty liver disease or liver toxicity, e.g., acute liver toxicity or chronic liver toxicity. By way of example, in some embodiments, after treatment and/or during a course of treatment, a subject exhibits one or more of decreased blood pressure, decrease or stabilized blood glucose level, reduction in body weight, decreased blood level of miR-122, and/or decreased blood level of TNF-α as compared to the subject before treatment, or compared to an untreated control subject. In some embodiments, a subject is administered a disclosed miR-122 inhibitor and exhibits one or more of: improved glycemic control and improved vascular dysfunction.

In some embodiments, a composition of the present disclosure is administered to a subject according to a schedule as determined by one of skill in the art (as discussed previously), taking into consideration clinical and/or diagnostic variables particular to that subject. In some embodiments, the composition is administered once per day, every other day, twice per day. In some embodiments, the composition is administered for 1, 2, 3, 4, 5, 6, 7, 8, 9, 10, 11, 12, 13 days, 2 weeks, 3 weeks, 4 week, 5 weeks, 6 weeks, 3 months, 6 months, 1 year or more.

The disclosed methods may include administering an additional active agent to the subject, e.g., semaglutide or metformin. The additional active agent may be administered at the same time or frequency as the disclosed compositions. Alternatively, the additional active agent may be administered according to its own administration route and schedule as determined by a physician.

Without being limited by any theory or mechanism, the disclosed γPNA inhibitors of miR-122 have several surprising advantages to other miRNA inhibitors. By way of example, but not by way of limitation, when administered to a subject, the disclosed γPNAs peak in concentration in the serum at roughly 1-hour post administration and are quickly eliminated thereafter. Therefore, the disclosed compounds do not accumulate in vital tissues causing adverse effects in subjects.

Illustrative Embodiments

1. A composition comprising a γ-PNA oligomer, the oligomer comprising a nucleic acid sequence complementary to miR-122.
2. The composition of embodiment 1, wherein the γ-PNA oligomer comprises a γ-diethylene glycol moiety.
3. The composition of embodiment 1 or 2, wherein the nucleic acid sequence comprises SEQ ID NO:1: ACC TCA CAC TGG TAC CAC AAA C.
4. The composition of any one of embodiment 1-3, comprising one or more lysines flanking the γ-PNA oligomer.
5. A composition comprising, from N terminus to C terminus:

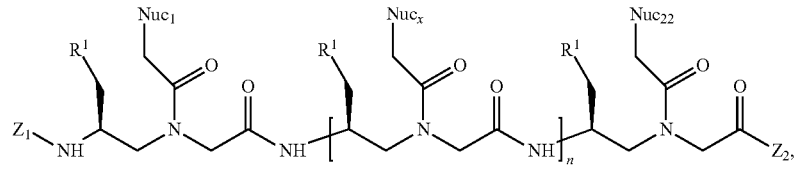

wherein $R^1$ is diethylene glycol;
n is 19;
$Nuc_1$, $Nuc_x$, and $Nuc_{22}$ are nucleic acids selected from adenine, thymine, guanine and cytosine, wherein x is ascending integers from 2-22 and, wherein, the sequence of $Nuc_{1-22}$ corresponds to the nucleic acid sequence ACC TCA CAC TGG TAC CAC AAA C (SEQ ID NO: 1);
and $Z_1$ and $Z_2$ are independently 1-5 lysines attached linearly by amide bonds.
6. A pharmaceutical composition comprising the composition of any one of the preceding embodiments and at least one pharmaceutical excipient or carrier.
7. The pharmaceutical composition of embodiment 6, comprising an additional active agent.
8. A method of treating a disease or disorder associated with aberrant miR-122 expression in a subject in need thereof, the method comprising: administering an effective amount of the pharmaceutical composition of embodiment 6 to the subject to treat the disease or disorder.
9. The method of embodiment 8, wherein the disease or disorder associated with aberrant miR-122 expression is selected from type 2 diabetes, obesity, and hypertension.
10. The method of embodiment 9, wherein the disease or disorder is type 2 diabetes.
11. The method of embodiment 8, wherein administration comprises oral, nasal, topical, or parenteral administration.
12. A method to lower the risk or severity of a cardiovascular event in a subject in need thereof, the method comprising: administering an effective amount of a compound that inhibits miR-122.
13. The method of embodiment 12, wherein a subject in need thereof comprises a subject diagnosed with one or more of type 2 diabetes, obesity, and hypertension, and/or an increased blood level of miR-122.
14. The method of embodiment 12 or 13, wherein the compound that inhibits miR-122 comprises an oligomer, the oligomer comprising a nucleobase sequence complementary to miR-122 and comprising at least one PNA monomer.
15. The method of embodiment 14, wherein the at least one PNA monomer comprises a γ-PNA.
16. The method of embodiment 15, wherein the at least one PNA monomer comprises a γ-diethylene glycol-modified γPNA.
17. The method of any one of embodiments 14 or 15, wherein the nucleobase sequence comprises SEQ ID NO: 1: ACC TCA CAC TGG TAC CAC AAA C.

18. The method of embodiment 12, wherein the compound that inhibits miR-122 comprises, from N terminus to C terminus:

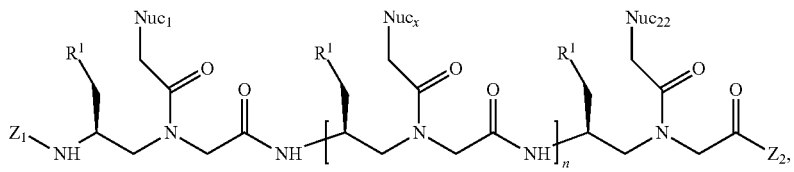

wherein $R^1$ is diethylene glycol;
n is 23;
$Nuc_1$, $Nuc_x$, and $Nuc_{25}$ are nucleic acids selected from adenine, thymine, guanine and cytosine, wherein x is ascending integers from 2-24 and, wherein, the sequence of $Nuc_{1-25}$ corresponds to the nucleic acid sequence ACC TCA CAC TGG TAC CAC AAA C (SEQ ID NO: 1);
and $Z_1$ and $Z_2$ are independently 1-5 lysines attached linearly by amide bonds.

19. The method of embodiment 8 or 12, wherein administration comprises oral, nasal, topical, or parenteral administration.

20. The method of embodiment 8 or 12, wherein the compound is administered every other day, once per day, twice per day, for 1, 2, 3, 4, 5 6, 7, 8, 9, 10, 11, 12, 13 days, two weeks, 3 weeks, 4 week, 5 weeks, 6 weeks, 6 months, 1 year, or as needed.

21. A method of improving glycemic control in a subject in need thereof, the method comprising: administering an effective amount of the pharmaceutical composition of embodiment 6 to the subject to improve glycemic control.

22. A method of increasing acetylcholine-dependent vascular relaxation of blood vessels in a subject in need thereof, the method comprising: administering an effective amount of the pharmaceutical composition of embodiment 6 to the subject to increase acetylcholine-dependent vascular relaxation of blood vessels in the subject.

23. A method of decreasing body weight in a subject in need thereof, the method comprising: administering an effective amount of the pharmaceutical composition of embodiment 6 to the subject to decrease body weight in the subject.

24. A composition comprising a γ-PNA oligomer, the oligomer comprising a nucleic acid sequence complementary to miR-122 and a targeting peptide.

25. The composition of embodiment 24, wherein the γ-PNA oligomer comprises a γ-diethylene glycol moiety.

26. The composition of embodiment 24 or 25, wherein the nucleic acid sequence comprises SEQ ID NO: 1: ACC TCA CAC TGG TAC CAC AAA C.

27. The composition of any one of embodiments 24-26, comprising one or more lysines flanking the γ-PNA oligomer.

28. The composition of any one of embodiments 24-27, wherein the targeting peptide comprises SEQ ID NO: 3.

29. The composition of any one of embodiments 24-28, wherein the targeting peptide is linked to the γ-PNA oligomer linearly by amide bond.

EXAMPLES

The following Examples are illustrative and should not be interpreted to limit the scope of the claimed subject matter.

Example 1—γ Peptide Nucleic Acid-Based miR-122 Inhibition Rescues Vascular Endothelial Dysfunction in Mice Fed a High-Fat Diet One promising approach to effectively combat endothelial dysfunction involves targeting microRNAs (miRs).[16] Specifically, miR-122-5p (miR-122) is considered a target because of its elevated levels in patients with diabetes and/or obesity,[17-23] which correlates with cardiovascular disorders.[24-27] miR-122 is primarily expressed in the liver and released into the blood.[28-30] Its release into the blood is increased in the contexts of obesity, non-alcoholic fatty liver disease, and liver toxicity.[31-32] We recently demonstrated that in endothelial cells, miR-122 regulates expression of the pro-inflammatory miR-204, a molecule that promotes vascular endothelial dysfunction.[33] Also, a recent report established that inhibition of miR-122 prevents atherosclerosis in ApoE[−/−] mice, which are hypercholesterolemic and spontaneously develop atherosclerosis.[34] Therefore, we postulate that systemic inhibition of miR-122 will prevent the development of endothelial dysfunction.

The miR inhibitors are DNA analogs that consist of either a natural negatively charged phosphodiester backbone (conventional) or a modified phosphodiester backbone.[35] The negatively charged backbones of inhibitors interact non-specifically with proteins, prolonging their half-lives and leading to adverse outcomes because of non-specific accumulation in the tissues.[36-38] The inhibitors with chemically modified phosphodiester backbone are superior, demonstrating robust enzymatic stability and higher binding affinity.[39] Among these, peptide nucleic acids (PNAs) have gained substantial attention as potential miR inhibitors in recent years.[40] PNAs are synthetic DNA mimics in which the phosphodiester backbone is replaced with an N-(2-aminoethyl) glycine backbone,[41] are enzymatically stable, and have a high binding affinity for target sites.[42] Although the charge neutrality of PNAs has the benefit of reducing their non-specific interactions with serum proteins, these early (classical) forms have the disadvantages of being poorly soluble in water. Because of this limitation, the classical PNAs did not progress as the molecules of choice.[38-39, 43-45] The next generation PNAs that include modification at the gamma (γ)-position of the nucleobase, known as γPNAs, form pre-organized helical structures by engaging γ position of the backbone as the stereogenic center.[46] This pre-organization confers even stronger binding affinity for the target RNA than that of the classical PNAs.[47] A second improvement in the γPNAs is that they contain diethylene glycol units, which increase their solubility and hence their biocompatibility.[48] In prior studies, we established that the γPNAs have improved water solubility and increased binding affinity for target RNA sites. In addition, γPNAs neither aggregate nor adhere to proteins non-specifically.[49-50] collectively, the features of the γPNAs—a charge-neutral backbone, high water solubility, and a high binding affinity for miRs—make them excellent candidates for gene targeting and editing-based applications.[49-50] γPNAs have been established as effective tools in several biological and biomedical applications: genetic barcoding;[51] nanotechnology-mediated delivery;[52] gene editing;[53-56] and gene targeting.[57-58] However, the γPNA technology has not been tested for generating miR-inhibitors that inhibit cardiovascular disorders.

Here, we tested the effectiveness of the γPNA technology in inhibiting miR-122 activity and rescuing endothelial dysfunction in prediabetic mice. Our results demonstrate that γPNA-based miR-122 inhibitor efficiently inhibits miR-122, improves glycemic control and endothelial dysfunction in prediabetic mice, and is safe in short- and long-term use.

Results

The design and characterization of γP-122-I

Figure 7A:
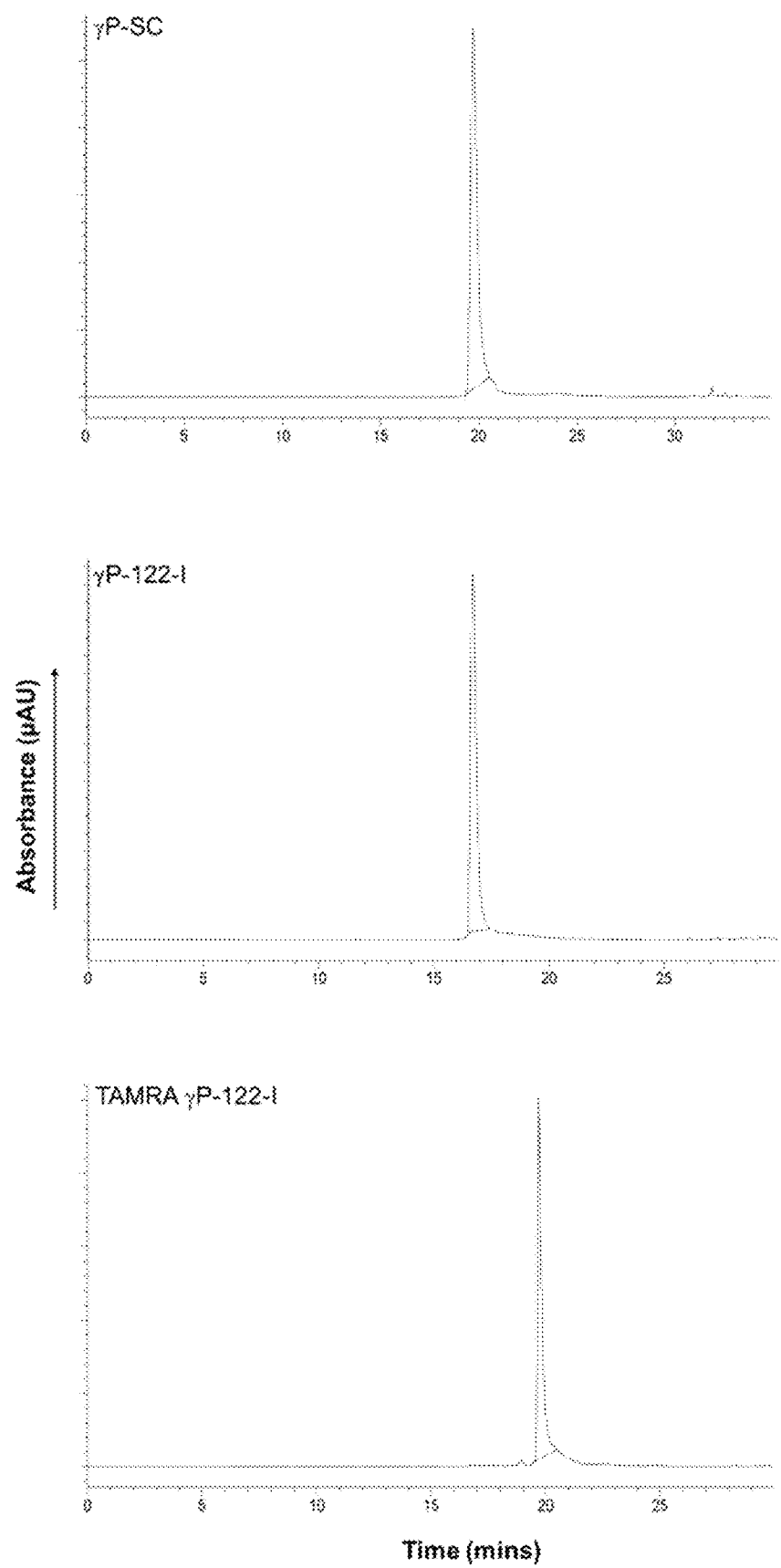
FIGS. 7A and 7B. Purity and identification of γPNAs. (A) High-performance liquid chromatography (HPLC) of γP-SC, γP-122-I, and TAMRA γP-122-I. (B) Matrix-Assisted Laser Desorption/Ionization (MALDI) spectrometry of γP-SC, γP-122-I, and TAMRA γP-122-I.
Figure 7B:
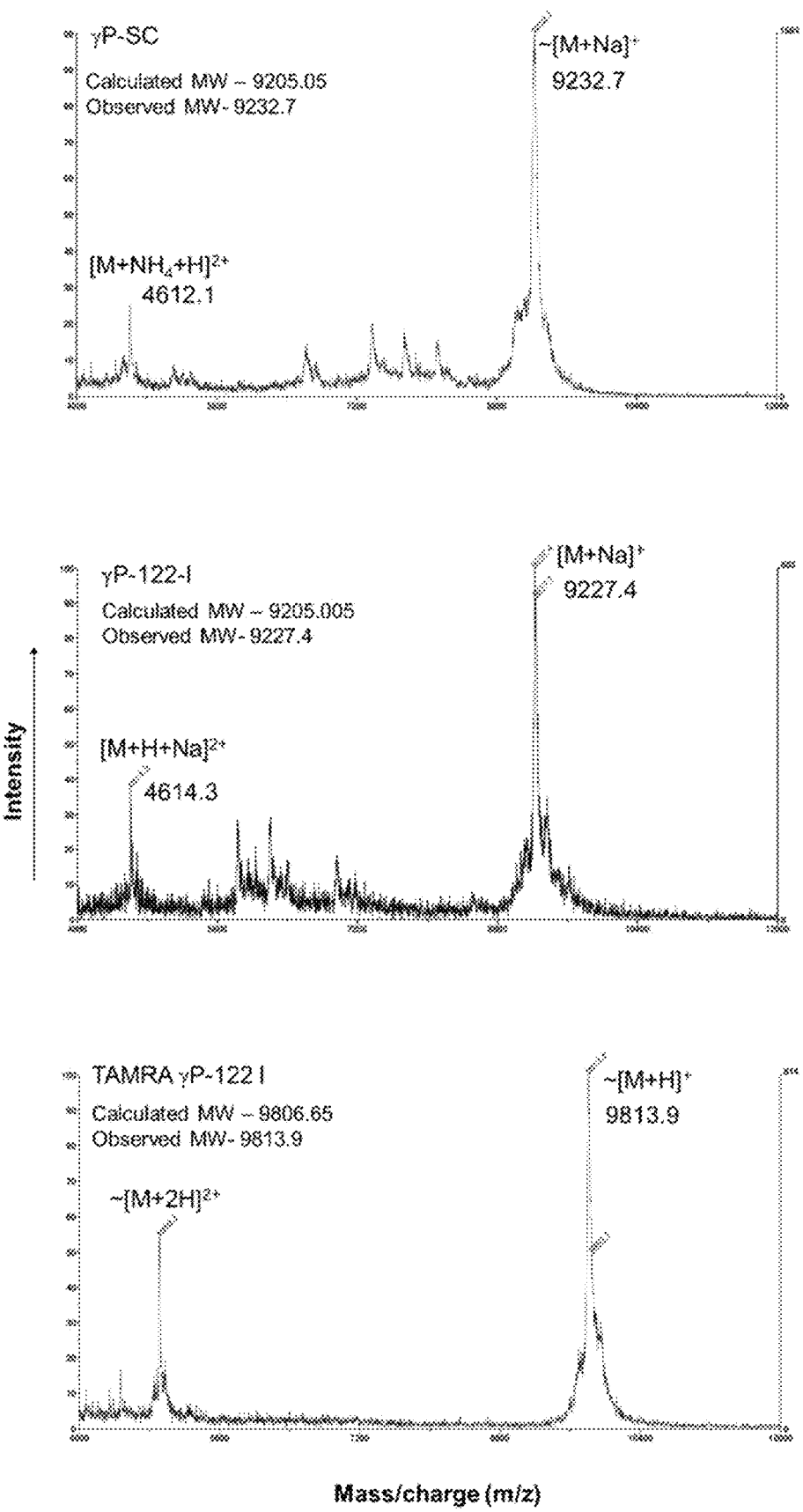

To test the effectiveness in targeting miR-122, we designed and synthesized both miR-122-targeting and scrambled control γPNA oligomers. The γ-modified nucleobases contained diethylene glycol at the γ position. To improve the solubility of PNA and its binding to miR-122, we appended lysine to both the 5' and 3' ends of γPNA, based on our prior study showing that lysine increases the binding affinity of PNAs.[33] We synthesized diethylene-glycol containing γPNA-based miR-122 inhibitors (FIGS. 1A & B, γP-122-I) and scrambled controls (FIG. 1B, γP-SC). The γPNAs were synthesized using established solid-phase protocols,[59] and their quality was determined by high-performance liquid chromatography (HPLC) & Matrix-Assisted Laser Desorption/Ionization (MALDI) spectrometry(FIG. 7). We next determined the binding of γP-122-I with miR-122 by gel-shift assay, and found that the amount of miR-122 bound by γP-122-I was dependent on the concentration of the latter (FIG. 1C). The binding affinity of γP-122-I for miR-122 was analyzed by thermal denaturation of heteroduplexes formed between the inhibitor and miR-122. For comparison, we also evaluated the denaturation of heteroduplexes formed from a commercially available miR-122 inhibitor (C-122-I,) and the same target construct. We found that the temperature at which the γP-122-I:miR-122 heteroduplexes were denatured was significantly higher ($T_m=95\pm0.2°$ C.) than that at which this occurred for C-122-I:miR-122 heteroduplexes ($T_m=66\pm0.8°$ C.) (FIG. 1D).

Figures 2D, 2E, 2F, 2G:
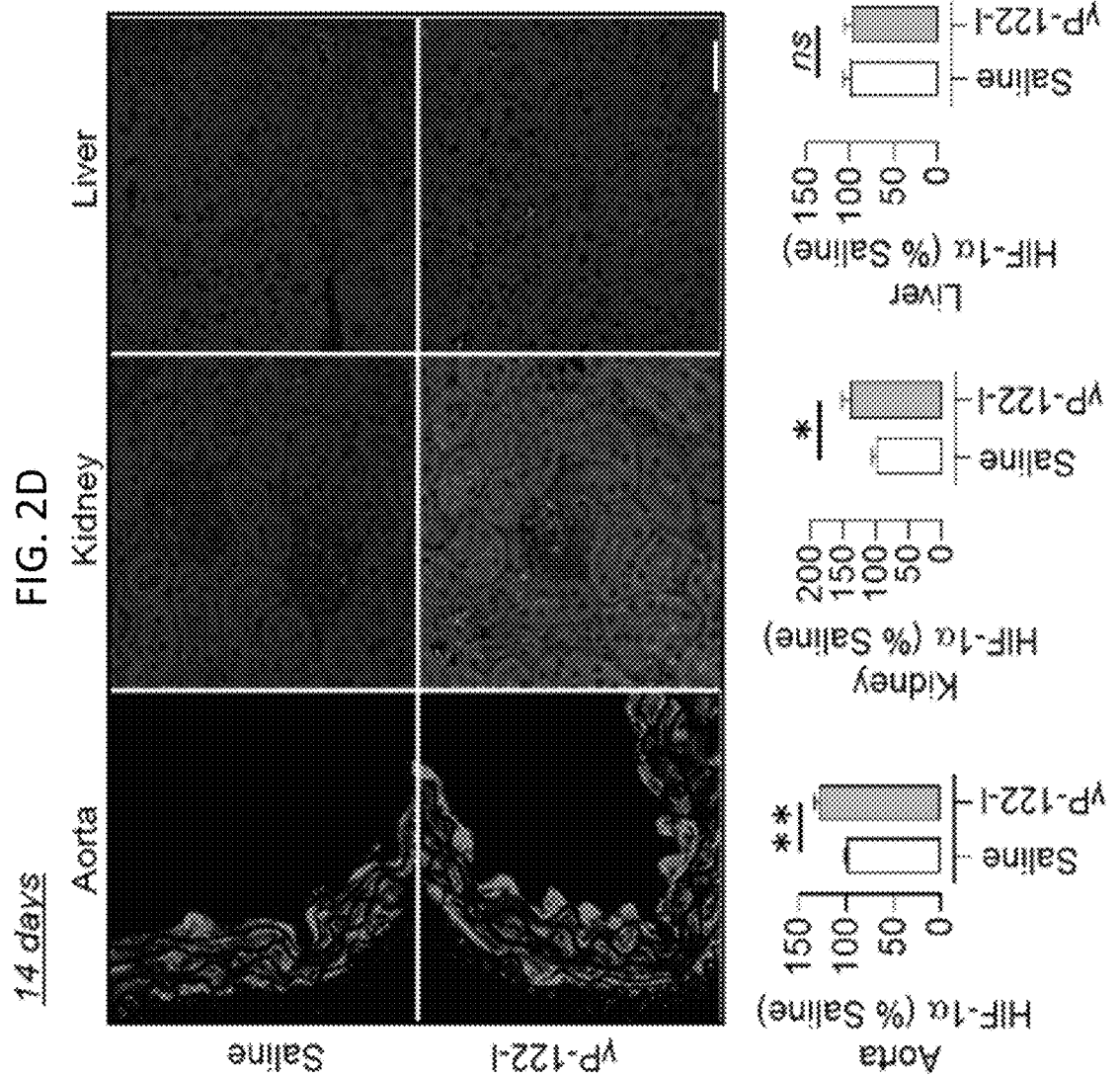
Figure 8B:
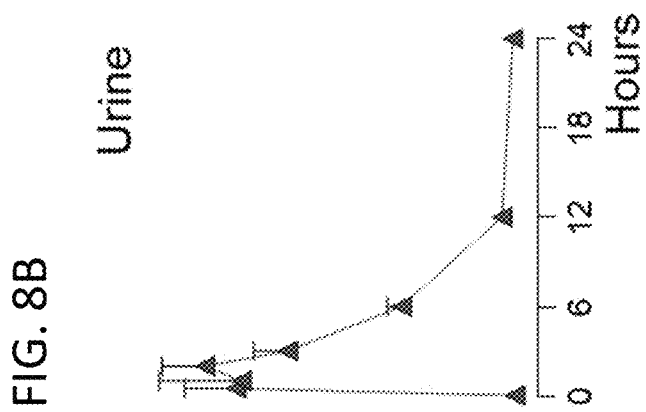
FIGS. 8A and 8B. Time-dependent changes in levels of TAMRA-γP-122-I. Inhibitor levels in (A) serum and (B) urine, as determined by measurement of fluorescence (561 nm). Data are shown as mean, and the error bar represents s.e.m.
Figure 8A:
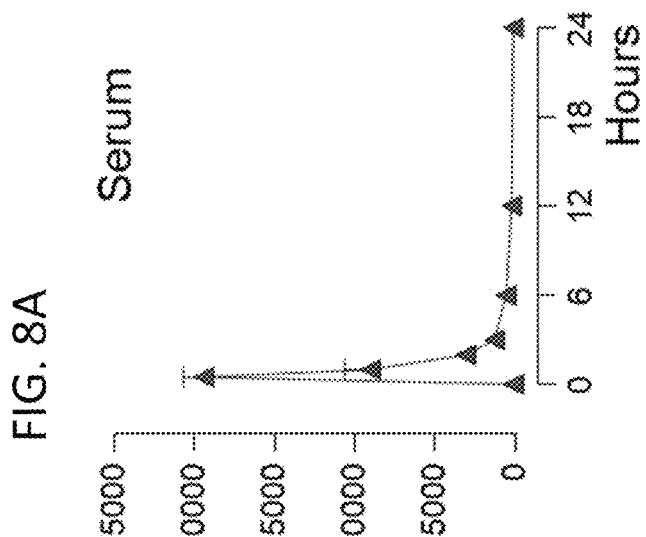

Our rationale for developing γP-122-I is based on its anticipated biocompatibility, which depends on its lower non-specific tissue retention. We thus evaluated the effects of this inhibitor on the hepatic and renal expression of the miR-122 target HIF-1α (a surrogate marker of miR-122 inhibition).[60-61] Male mice were injected with either γP-122-I or C-122-I (62.5 nmol·kg$^{-1}$) for three days, and then HIF-1α expression was assessed. We found that γP-122-I had less effect than C-122-I on HIF-1α expression in the kidney (FIGS. 2A & B). At this dose, we did not observe an increase in HIF-1α expression in the liver with either γP-122-I or C-122-I (FIGS. 2A & C). As the liver expresses 100 to 1000-fold more miR-122 than serum, the vasculature, and the kidney,[28] we reasoned that this dose and the duration of treatment (γP-122-I or C-122-I) were inadequate to change HIF-1α. Thus, we tested γP-122-I at a higher dose (1.25 μmol·kg$^{-1}$) and for a longer duration (14 days). This led to an increase in HIF-1α in aorta and kidney but still failed to induce a significant change in the liver (FIG. 2D-G). The biodistribution of γP-122-I was determined using TAMRA-tagged γP-122-I. We found that following intraperitoneal injection, its concentration peaks in serum and urine at 0.5 and 2 hours, respectively (FIG. 8).

γP-122-I rescues endothelial dysfunction and increased blood glucose levels in mice fed a HFD.

Figure 3A:
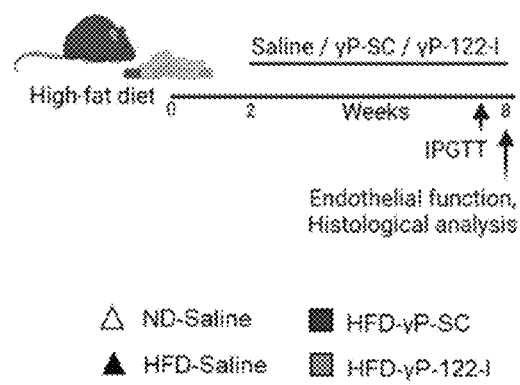
FIGS. 3A, 3B, 3C, 3D, 3E, 3F, 3G, 3H, and 3I. Effects of systemic administration of γP-122-I on HFD-triggered defects in glucose tolerance and endothelial function. (A) Schematic showing the timing of HFD-feeding, treatment with γP-SC and γP-122-I, and termination of the experiment. It was created with BioRender.com. (B & C) Effects of γP-122-I (0.25 μmol·kg$^{-1}$ or 5 mg/kg) on HFD-triggered upregulation of miR-122 in the blood (B, n=4-9) and aorta (C, n=3-6). (D) Effects of γP-122-I on HFD-triggered impairment of acetylcholine-induced vasorelaxation of aortic rings that had been precontracted (treatment with phenylephrine: 10$^{-6}$ M). n(N)=6(2)-18(6). (E) Effects of γP-122-I on HFD-triggered impairment of acetylcholine-induced vasorelaxation of aortic rings that had been precontracted to equal tension (2.7 millinewtons; treatment with phenylephrine). n(N)=8(2)-14(6). (F) Effects of γP-122-I on sodium-nitroprusside (SNP)-induced vasorelaxation of precontracted (phenylephrine: 10$^{-6}$ M) aortic rings. n(N)=8(2)-24(6). The replicate for 'D-F' is shown as n(N), where n; aortic ring number, N; mice number. (G & H) Effects of treatment with γP-122-I on the random blood glucose level and glucose disposal during intraperitoneal glucose tolerance tests. n=4-8. (I) Quantitation of the area under the curve (AUC) in 'H.' n=5-10. Regression analysis data for XY plots were used to determine the significance of the difference. *p<0.05, p<0.01, *p<0.001 vs. indicated group. Data are shown as mean and error bars represent s.e.m. PE; Phenylephrine, Ach; Acetylcholine, mN; millinewtons.
Figure 3B:
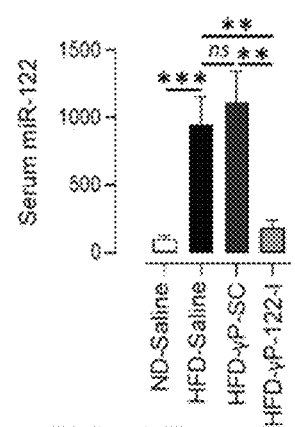
Figure 3C:
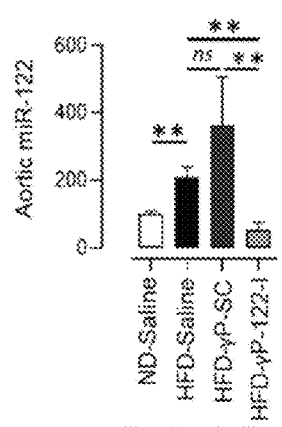
Figure 3D:
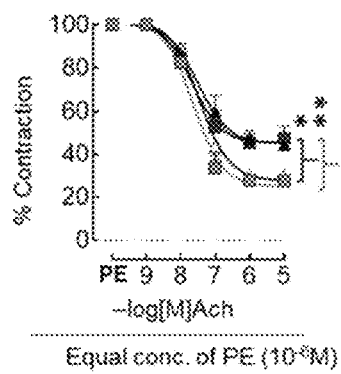
Figure 3E:
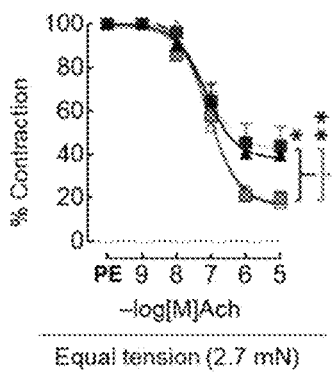
Figure 3F:
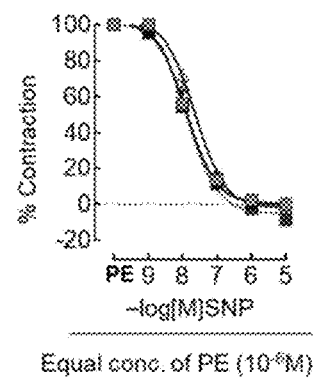
Figure 3G:
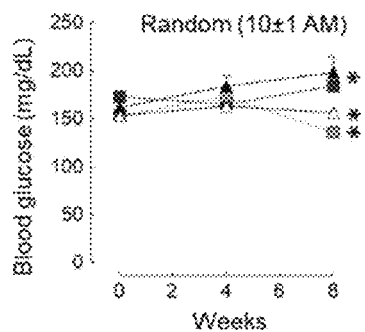
Figure 3H:
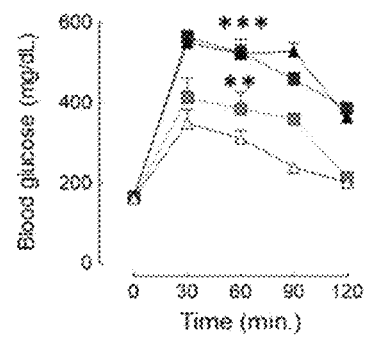
Figure 3I:
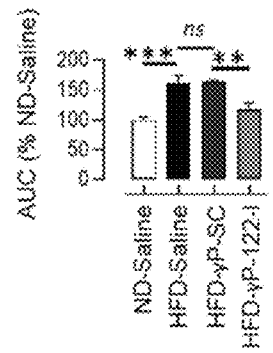
Figure 4C:
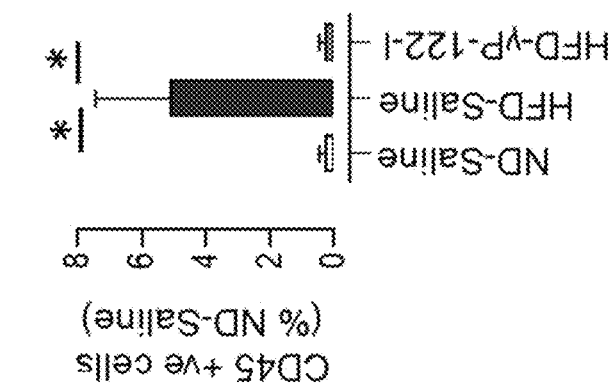
FIGS. 4A, 4B, and 4C. Effects of γP-122-I on HFD-triggered vascular inflammation. (A) As assessed by qPCR, the effect of γP-122-I on HFD-triggered upregulation of aortic TNF-α expression. n=4. (B & C) Effect of γP-122-I on HFD-triggered infiltration of CD45-positive cells in the aortic wall (B) and its quantification (C). (magnification ×40). L; lumen. n=7. *p<0.05 vs. indicated group. Data are shown as mean and the error bar represents s.e.m.
Figure 4B:
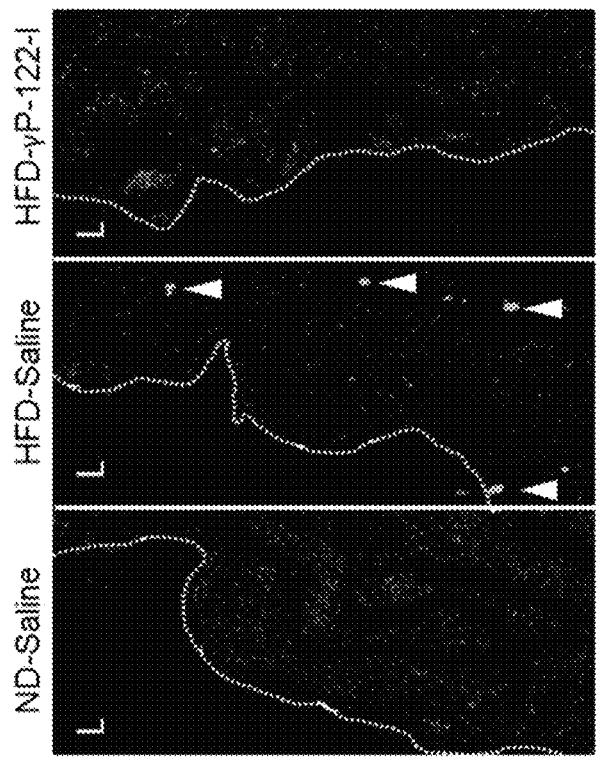
Figure 4A:
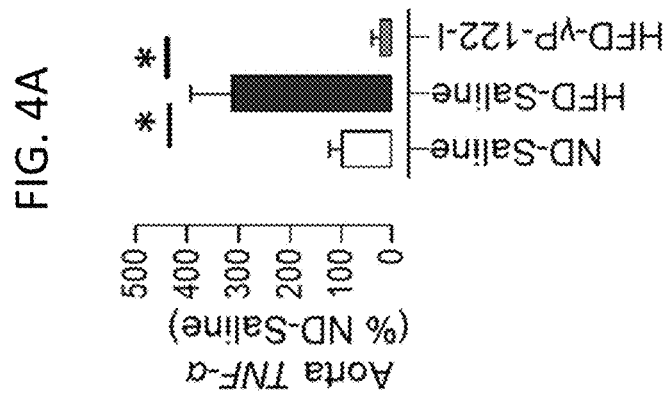
Figure 10B:
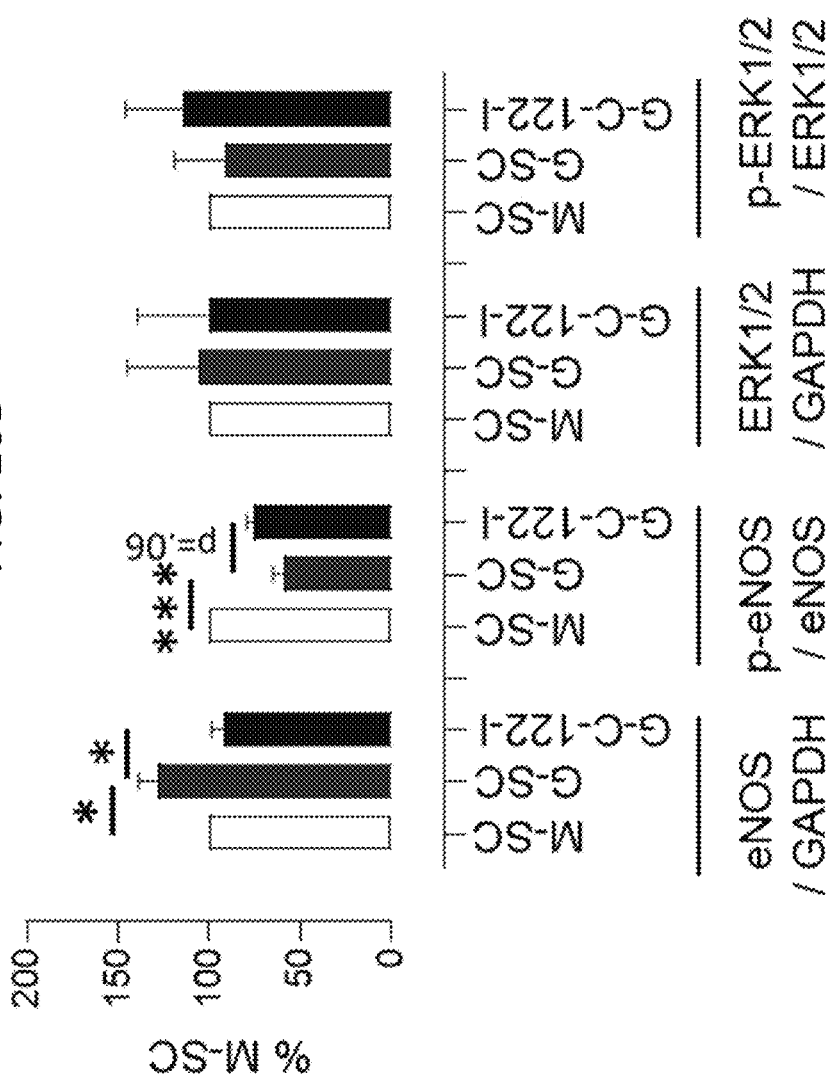
FIGS. 10A and 10B. Effects of C-122-I on the eNOS and ERK1/2 expression and activation in HUVECs. (A) Representative immunoblots showing the levels of p-eNOS, eNOS, p-ERK1/2, ERK1/2, and GAPDH in HUVECs under hyperglycemic conditions (25 mmol/L, 24 hours) treated with either C-122-I or scrambled control (SC) (20 nM). M-SC; cells treated with mannitol and SC, G-SC; cells treated with glucose and SC, G-C-122-I; cells treated with glucose and C-122-I. (B) Quantification of eNOS, p-eNOS, ERK1/2, and p-ERK1/2 in the HUVECs. n=4. ns p>0.05, *p<0.05, ***p<0.001 vs. indicated group. Data are shown as mean, and the error bar represents s.e.m.
Figure 10A:
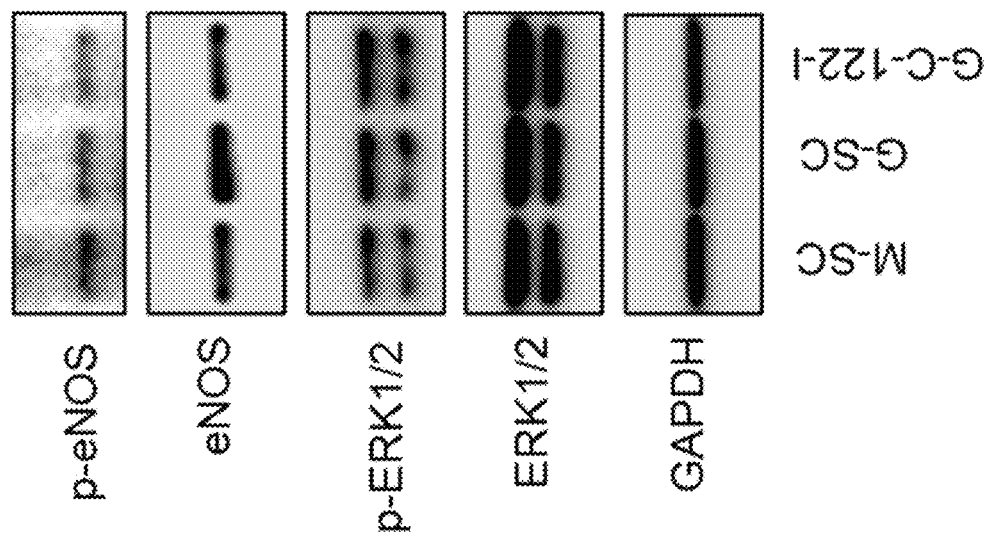

A calorie-rich diet leads to impaired glycemic control that resembles the early stages of diabetes.[62-63] Similarly, mice kept on a HFD for eight weeks develop significant impairment of endothelium-dependent (acetylcholine-mediated) vascular relaxation and glycemic control.[33, 64] Here, we used this prediabetic mouse model to investigate the effects of γP-122-I on endothelial function. We treated HFD-fed mice with γP-122-I at 0.25 μmol·kg$^{-1}$ (5 mg/kg) for six weeks beginning two weeks after the dietary intervention (FIG. 3A). Mice fed a normal diet (ND) and HFD-fed mice that received saline or γP-SC served as controls. Feeding of the HFD led to a significant increase in serum and vascular levels of miR-122, and this effect was significantly inhibited in HFD-fed mice that received γP-122-I (FIGS. 3B & C). We assessed endothelium-dependent (acetylcholine-mediated) vascular relaxation of aortic rings precontracted by treatment with phenylephrine (PE, 10$^{-6}$ M). Aortic rings isolated from HFD-fed mice receiving saline or γP-SC (positive controls) had impaired endothelial function relative to those from mice on the ND and receiving saline (negative controls). The HFD-fed mice receiving γP-122-I displayed significant recovery of endothelial dysfunction (FIG. 3D). As diabetic conditions per se affect the contractility of blood vessels, we additionally measured the effects of γP-122-I on the acetylcholine-dependent vascular relaxation of aortic rings that were contracted to equal tension (2.7±0.15 millinewtons). We found that in the aorta isolated from the mice receiving γP-122-I, the relaxation was significantly improved (FIG. 3E). Sodium-nitroprusside (SNP) is a nitric-oxide donor and induces endothelium-independent vasorelaxation. In contrast to acetylcholine-induced vasorelaxation, SNP-induced vasorelaxation did not differ in HFD-fed mice receiving γP-SC or γP-122-I, suggesting that γP-122-I improves endothelial function (FIG. 3F). Next, we ascertained the effect of γP-122-I on glycemic control and found that it significantly improved random serum glucose levels and blood glucose disposal during the intraperitoneal glucose tolerance test (IPGTT) (FIG. 3G-I). We also noticed a significant reduction in body weight but no change in the overall adiposity in HFD-fed mice receiving γP-122-I (FIGS. 9A & B). In diabetes and obesity, PPAR-α is a target for controlling glycemia and metabolic dysregulation,[65-66] and miR-122 can regulate PPAR-α.[67] Therefore, we measured the effect of γP-122-I on hepatic PPAR-α and found that it decreases the HFD-induced PPAR-α upregulation in the HFD-fed mice (FIG. 9C). The endothelial dysfunction in HFD-mice is associated with vascular inflammation. Therefore, we assessed the effect of γP-122-I on vascular inflammation and found that it reduced an HFD-triggered increase in the aortic expression of TNF-α (FIG. 4A). CD45 is a marker of hematopoietic cells, and the increased frequency of CD45-positive cells suggests that at least one inflammatory cell type was activated.[68] Staining of aortic sections for CD45 revealed a significant reduction in the frequency of CD45-positive cells in the aortic wall of γP-122-I-treated versus saline-treated HFD-fed mice (FIGS. 4B & C). The inflammation could also be mitigated by improving glycemic control and a decrease in body weight, contributing to endothelial dysfunction rescue. To determine the endothelial contribution to the endothelial function of HFD-mice treated with the miR-122 inhibitor, we assessed the effects of miR-122 inhibition on eNOS and ERK1/2 in-vitro under hyperglycemic conditions. The hyperglycemic conditions decrease eNOS[69,70] and increase ERK1/2 activation.[71-72] We found that hyperglycemia (25 mmol/L, 24 hours) increases eNOS expression but decreases its activation (p-eNOS) in the human umbilical vein endothelial cells (HUVECs), the effect that was partially reversed by the miR-122 inhibition (FIG. 10). No significant difference in either expression or activation of ERK1/2 in HUVECS under hyperglycemic conditions was observed, and neither was it affected by the miR-122 inhibition (FIG. 10).

In Vivo Toxicity of γP-122-I

To determine the in vivo safety of γP-122-I, we measured its acute (24 hours) effects, at the dose of 0.25 μmol·kg$^{-1}$, on the complete blood count (CBC) and assessed the blood levels of biochemical indicators of liver and kidney function. Acute exposure to γP-122-I was not associated with an appreciable difference relative to the control, in terms of white blood cells (WBC) counts, red blood cells (RBC) counts, hemoglobin (HGB) levels, hematocrit (HCT), mean corpuscular volume (MCV), and mean corpuscular hemoglobin concentration (MCHC) (FIG. 5A). In addition, the acute exposure of γP-122-I was not associated with significant differences relative to the saline-treated group in terms of liver and kidney function, as indicated by the levels of aspartate aminotransferase, alanine aminotransferase, alkaline phosphatase, lactate dehydrogenase, blood urea nitrogen, and creatinine (FIG. 5B).

Next, we determined the long-term (six weeks) effects of γP-122-I at the dose of 0.25 μmol·kg$^{-1}$·day$^{-1}$ on body weight gain, adiposity, and organ histology (liver, kidney, and heart). We found that the HFD significantly increased body weight and was not affected by the administration of γP-SC for six weeks. However, HFD-fed mice that received γP-122-I were slightly leaner than HFD-fed mice that received γP-SC or saline (FIG. S3A). The HFD-feeding increased adiposity, which was not affected by either γP-SC or γP-122-I (FIG. S3B). We compared hematoxylin and eosin-stained histological sections of kidney, liver, and heart from ND-fed mice receiving saline, HFD-fed mice receiving saline, HFD-fed mice receiving γP-SC, and HFD-fed mice receiving γP-122-I. In the cases of kidney and heart, no histological differences were detected across these experimental groups (FIG. 6). The liver of HFD-fed mice had a high frequency of vacuolation, a sign of fat deposition. However, the liver of HFD-fed mice treated with γP-122-I was histologically not different compared to HFD-fed mice treated with either saline or γP-SC (FIG. 6).

Discussion

In prior studies, inhibiting miR-122 in the context of the hepatitis C virus showed promise.[73-78] However, the miR-122 inhibitor (RG-101) developed by Regulus Technologies was put on clinical hold due to the development of jaundice.[76,79] Further, the studies in hepatocellular carcinoma patients and mice lacking miR-122 raised concern over the long-term effects of inhibiting miR-122 on hepatic function.[80-82] In general, the moderate efficacy of previous miR-targeted inhibitors and the associated adverse effects are the critical roadblocks in developing miR therapeutics. Other concerns associated with using miR inhibitors for clinical applications are their moderate efficacy and adverse effects. The latter include prolonging the activated partial thromboplastin time (aPTT; time it takes for clotting to occur), activating the complement cascade, and non-specific accumulation in tissues. The aPTT depends on the plasma concentration of oligonucleotides and is not clinically significant, as its impact can be weakened by optimizing the delivery regimen.[83-85] The time of complement cascade activation cannot be predicted based on the properties of a miR inhibitor and must be determined for each. However, the accumulation of nucleic acid analogs, which depends on their negative charges, prolongs the half-life (2-4 weeks) and contributes to adverse outcomes.[37, 86-87] γPNA-based inhibitors provide new avenues for developing miR therapeutics for clinical translation. Indeed, one such inhibitor effectively targets miR-210 for cancer therapy.[88] Previous studies employing metabolic and cytokine analyses support the in vivo biocompatibility of γPNAs.[51, 57, 88] However, little progress has been made in targeting miRs for cardiometabolic disorders. Our observation showing that neither the short (24-hour)- nor long (six-week)-term exposure of γP-122-I is toxic (FIGS. 5 & 6) supports the biocompatibility of γPNAs.

γPNAs are highly resistant to cleavage by nucleases and proteases, which are highly substrate-specific, and thus they are not degraded inside the cell and form a highly stable duplex.[89] Prior studies established that, on average, adding each γ modified nucleobase in the PNA increases the thermal binding of a PNA-RNA duplex by 5° C.[40] The thermal denaturation temperature of duplexes was significantly higher when γP-122-I, versus C-122-I, bound to miR-122, supporting the expectation that the affinity of γP-122-I for miR-122 is stronger (FIG. 1D). miR-122 is found in the serum with argonaute2, the main component of the RNA-induced silencing complex, and can be internalized by neuropilin-1-expressing endothelial cells.[90-92] It promotes endothelial cell apoptosis and is a risk factor for endothelial dysfunction.[93-95] A recent report shows that the inhibition of miR-122 prevents atherosclerosis in ApoE$^{-/-}$ mice.[34] Here, we observed that systemic administration of γP-122-I rescued endothelial dysfunction and improved glycemic control. The experimental and clinical studies show a positive association between serum miR-122 and hyperglycemia.[20, 33, 67, 96] Recently, we found that miR-122 regulates the expression of pro-inflammatory miR-204 in vascular endothelial cells.[33] miR-204 is highly expressed in vascular endothelial cells,[33, 64] and pancreatic (β-cells.[97-98] The inhibition or genetic deletion of miR-204 improves endothelial function and glycemic control despite obesity in the genetically diabetic db/db mice.[33, 99] Castano et al. reported that the systemic administration of serum exosomes isolated from obese mice overexpressed miR-122 and promote obesity and glucose intolerance in the lean mice by regulating PPAR-α in the epididymal white adipose tissue.[67] Further, the HFD-fed mice overexpress PPAR-α in liver[65], and those lacking PPAR-α are protected from HFD-induced hyperglycemia.[66] We also noted that γP-122-I reversed HFD-induced increase in PPAR-α levels in the liver. Therefore, the effects of miR-122 inhibition on miR-204 and PPAR-α are the potential mechanism through which γP-122-I improves the endothelial function and glycemic control in HFD-fed mice. As superior glycemic control can itself improve endothelial function,[100] it is possible that the observed γP-122-I-associated improvement in endothelial function is a consequence of a combination of miR-122 inhibition in the aorta and improved glycemic control. The high glucose condition decreases eNOS activation.[69-70] Our results show that miR-122 inhibition partially rescues a high-glucose-induced increase in the eNOS expression and a decrease in the eNOS activation in HUVECs (FIG. 10), supporting that improvement in endothelial function by miR-122 inhibition at least in part contributes to the improved endothelial function.

The novel γPNA-based miR-122 inhibitor γP-122-I rescues vascular endothelial dysfunction without showing any evidence of toxicity acutely or chronically in vivo. Accordingly, γPNA technology can be employed to generate next-generation miR-inhibitors that are efficient and safer for other disease conditions.

Experimental Section

General experimental: Institutional Animal Care and Use Committee of the University of Iowa approved the animal experiments and were performed according to National Institutes of Health (NIH) guidelines. All mice were maintained in a pathogen-free environment at the University of Iowa. C57BL/6 mice aged 8-16 weeks were used for the experiments. Eight-week-old mice were fed a HFD (TD.88137, Envigo, IN, USA; containing 21.2% (wt/wt) fat, 48.5% (wt/wt) carbohydrate, 17.3% (wt/wt) protein, and 0.2% (wt/wt) cholesterol) for eight weeks, and two weeks after this diet was initiated, they were injected with either γP-122-I or γP-SC (5 mgkg-1day-1, intraperitoneal route) for six weeks. Age-matched ND-fed mice serve as controls. All compounds that were in-vivo tested (γP-122-I and γP-SC) were >95% pure by HPLC (FIG. 7). The area under the curve for the single peaks from the RP-HPLC traces for γPNA oligomers and the absence of any failure sequences ensure that the γPNAs are >95% pure.

Design and synthesis of γP-SC and γP-122-I: BOC (tert-Butyloxycarbonyl)-protected diethylene glycol γ monomers were used for γP-122-I were procured from ASM Research Chemicals (Hannover, Germany). The monomers were vacuum dried prior to the start of solid-phase synthesis. Approximately 100 mg lysine-loaded resin was soaked in dichloromethane (DCM) for 5 hours in a reaction vessel. DCM was drained, and the resin was deprotected using a mixture of trifluoroacetic acid and m-cresol for 5 minutes. This deprotection step was repeated twice, followed by washing the resin with DCM and N, N-dimethylformamide (DMF). The monomer was dissolved in a coupling solution comprising 0.2M N-Methyl pyrrolidone (NMP), 0.52M Di-isopropylethylamine (DIEA), and 0.39M O-Benzotriazole-N,N,N',N'-tetramethyl-uroniumhexafluoro-phosphate (HBTU). The coupling solution was added to the reaction vessel and rocked for 2 hours. The resin was capped using a capping solution (mixture of NMP, pyridine, and acetic anhydride) and then washed with DCM (8×). The entire process was repeated until the last monomer was added. 5-carboxytetramethylrhodamine (TAMRA) was conjugated to the N terminus of γP-122 I. γPNA was cleaved from the resin using a cleavage cocktail (thioanisole, m-cresol, TMFSA, TFA (1:1:2:6), and the vessel was rocked for 1.5 hours. The γPNA was then collected and precipitated using diethyl ether, centrifuged at 3500 rpm for 5 minutes, washed with diethyl ether twice, and vacuum dried. γPNA were purified by HPLC and its absorbance was measured by Nanodrop (Thermofisher Scientific, MA). The extinction coefficients of the individual monomers used to calculate the PNA concentration are: 6,600 $M^{-1}$ $cm^{-1}$ (C), 13,700 $M^{-1}$ $cm^{-1}$ (A), 8,600 $M^{-1}$ $cm^{-1}$ (T), and 11,700 $M^{-1}$ $cm^{-1}$ (G).

Vascular reactivity: Vascular reactivity was determined as previously described.[33] Briefly, the aortic rings (thoracic aorta, 1.5-2.0 mm wide) were placed in ice-cold oxygenated (95% $O_2$/5% $CO_2$) Krebs-Ringer bicarbonate solution. The rings were placed in oxygenated organ bath filled with KB solution. The organ baths were maintained at 37° C. Each ring was suspended in a myograph system (DMT Instruments, FL, USA). The extent of endothelium-dependent vasorelaxation was determined by generating dose-response curves to acetylcholine (Ach,$10^{-9}$-$10^{-5}$ M) on aortic rings that had been precontracted by administering isotonic or isometric phenylephrine (PE,$10^{-6}$ M). Endothelium-independent vasorelaxation was determined by creating dose-response curves to SNP on aortic rings that had been precontracted with PE ($10^{-6}$ M). Vasorelaxation (elicited by acetylcholine and SNP) was represented as a percentage of relaxation, calculated by dividing the inhibition ratio by the precontracted tension. Aortic rings that did not react to KCl or demonstrated auto-relaxation were eliminated.

Cell culture: Human umbilical vein endothelial cells (Cat. No. CC-2519) were procured from Lonza (Mapleton, IL USA) and cultured in EGM-2 (Walkersville, MD USA) supplemented with growth factor. Cells were treated with high glucose (25 mM) for 24 hours to simulate hyperglycemic conditions. As an osmolarity control, mannitol (25 mM) was utilized.

qPCR: RNA was isolated using Trizol. miRs and RNAs were converted to cDNA using the qScript microRNA cDNA Synthesis Kit (Quanta bio). qPCR for miR-122 and TNF-α was performed using the SYBR Green RT-qPCR Kit, and 18S rRNA was used as an internal control. Serum miR levels were quantified using a constant amount of serum (200 μl).

Gel shift assays: miR-122 was incubated with PNAs (150 mM KCl, 2 mM MgCl2, 10 mM Na3PO4; pH 7.4) at 37° C. in a thermal cycler (T100™, Bio-Rad, Hercules, CA) for 18 hours. Samples were then separated on a 10% nondenaturing polyacrylamide gel using 1× tris/borate/EDTA buffer (1×TBE). After electrophoresis, the gels were stained with SYBR-Gold (Invitrogen) in 1×TBE buffer for 2 minutes and imaged using a Gel-Doc EZ imager (Bio-Rad, Hercules, CA).

Histological processing and immunostaining: Sections of formalin-fixed paraffin-embedded tissues were heated (95° C.) for 20 minutes in citrate buffer, followed by incubation with primary antibodies. For immunofluorescence experiments, anti-HIF-α (Thermofisher-MA1-516) and anti-CD45 (BD Pharmigen-610297) antibodies were used. Images were captured using Zeiss LSM 510. The histological sections were 5 mm thick and were stained using hematoxylin and eosin, and the images were captured using the Olympus microscope (BX-61).

Measurement of body weight and blood glucose levels, and performance of intraperitoneal GTT: The body weight and blood glucose levels in ND, HFD-saline, HFD-γP-SC, HFD-γP-122-I mice were measured at regular intervals (every 2 weeks). The mice fasted for six hours, and their fasting blood glucose levels were measured. For IPGTT, the mice were injected intraperitoneally with glucose solution (2 g/kg) six hours after fasting, and glucose levels were measured at 30, 60, 90, and 120-minute time points after glucose injection. The white adipose tissue (epididymal, WAT) and brown adipose tissue (interscapular, BAT) were collected and weighed. Adiposity was calculated as the combined weight of WAT and BAT per 100 g body weight.

Statistical analysis: GraphPad Prism was used for the statistical analysis (Version 9.1). The T-test was performed to establish the significance of the difference between the two groups. For multiple comparisons, ANOVA was utilized, and Tukey's test was used for posthoc analysis. Non-linear regression was used to assess the significance of the difference between the two vascular relaxation curves. The results were presented as mean±s.e.m. and were considered significant if the p values were <0.05.

REFERENCES

1. Katayama, S.; Hatano, M.; Issiki, M., Clinical Features and Therapeutic Perspectives on Hypertension in Diabetics. *Hypertens Res* 2018, 41 (4), 213-229.

2. Equiluz-Bruck, S.; Schnack, C.; Kopp, H. P.; Schernthaner, G., Nondipping of Nocturnal Blood Pressure Is Related to Urinary Albumin Excretion Rate in Patients with Type 2 Diabetes Mellitus. *Am J Hypertens* 1996, 9 (11), 1139-1143.
3. Lurbe, A.; Redon, J.; Pascual, J. M.; Tacons, J.; Alvarez, V.; Batlle, D. C., Altered Blood Pressure During Sleep in Normotensive Subjects with Type I Diabetes. *Hypertension* 1993, 21 (2), 227-235.
4. Senador, D.; Kanakamedala, K.; Irigoyen, M. C.; Morris, M.; Elased, K. M., Cardiovascular and Autonomic Phenotype of Db/Db Diabetic Mice. *Exp Physiol* 2009, 94 (6), 648-658.
5. Amar, J.; Vernier, I.; Rossignol, E.; Bongard, V.; Arnaud, C.; Conte, J. J.; Salvador, M.; Chamontin, B., Nocturnal Blood Pressure and 24-Hour Pulse Pressure Are Potent Indicators of Mortality in Hemodialysis Patients. *Kidney Int* 2000, 57 (6), 2485-2491.
6. Draman, M. S.; Dolan, E.; van der Poel, L.; Tun, T. K.; McDermott, J. H.; Sreenan, S.; O'Brien, E., The Importance of Night-Time Systolic Blood Pressure in Diabetic Patients: Dublin Outcome Study. *J Hypertens* 2015, 33 (7), 1373-1377.
7. Lurbe, E.; Redon, J.; Kesani, A.; Pascual, J. M.; Tacons, J.; Alvarez, V.; Batlle, D., Increase in Nocturnal Blood Pressure and Progression to Microalbuminuria in Type 1 Diabetes. *N Engl J Med* 2002, 347 (11), 797-805.
8. Oh, S. W.; Han, S. Y.; Han, K. H.; Cha, R. H.; Kim, S.; Yoon, S. A.; Rhu, D. R.; Oh, J.; Lee, E. Y.; Kim, D. K.; Kim, Y. S.; investigators, A. P., Morning Hypertension and Night Non-Dipping in Patients with Diabetes and Chronic Kidney Disease. *Hypertens Res* 2015, 38 (12), 889-894.
9. Ohkubo, T.; Imai, Y.; Tsuji, I.; Nagai, K.; Watanabe, N.; Minami, N.; Kato, J.; Kikuchi, N.; Nishiyama, A.; Aihara, A.; Sekino, M.; Satoh, H.; Hisamichi, S., Relation between Nocturnal Decline in Blood Pressure and Mortality. The Ohasama Study. *Am J Hypertens* 1997, 10 (11), 1201-1207.
10. Sturrock, N. D.; George, E.; Pound, N.; Stevenson, J.; Peck, G. M.; Sowter, H., Non-Dipping Circadian Blood Pressure and Renal Impairment Are Associated with Increased Mortality in Diabetes Mellitus. *Diabet Med* 2000, 17 (5), 360-364.
11. Verdecchia, P.; Porcellati, C.; Schillaci, G.; Borgioni, C.; Ciucci, A.; Battistelli, M.; Guerrieri, M.; Gatteschi, C.; Zampi, I.; Santucci, A.; Santucci, C.; Reboldi, G., Ambulatory Blood Pressure. An Independent Predictor of Prognosis in Essential Hypertension. *Hypertension* 1994, 24 (6), 793-801.
12. Verdecchia, P.; Schillaci, G.; Gatteschi, C.; Zampi, I.; Battistelli, M.; Bartoccini, C.; Porcellati, C., Blunted Nocturnal Fall in Blood Pressure in Hypertensive Women with Future Cardiovascular Morbid Events. *Circulation* 1993, 88 (3), 986-992.
13. Sasaki, N.; Ozono, R.; Edahiro, Y.; Ishii, K.; Seto, A.; Okita, T.; Teramen, K.; Fujiwara, S.; Kihara, Y., Impact of Non-Dipping on Cardiovascular Outcomes in Patients with Obstructive Sleep Apnea Syndrome. *Clin Exp Hypertens* 2015, 37 (6), 449-453.
14. Alqudsi, M.; Hiremath, S.; Velez, J. C. Q., Review—Current Opinion in Cardiology Hypertension in Chronic Kidney Disease. *Curr Opin Cardiol* 2020, 35 (4), 360-367.
15. Parsamanesh, N.; Asghari, A.; Sardari, S.; Tasbandi, A.; Jamialahmadi, T.; Xu, S.; Sahebkar, A., Resveratrol and Endothelial Function: A Literature Review. *Pharmacol Res* 2021, 170, 105725.
16. Femandez-Hernando, C.; Suarez, Y., Micrornas in Endothelial Cell Homeostasis and Vascular Disease. *Curr Opin Hematol* 2018, 25 (3), 227-236.
17. Prats-Puig, A.; Ortega, F. J.; Mercader, J. M.; Moreno-Navarrete, J. M.; Moreno, M.; Bonet, N.; Ricart, W.; Lopez-Bermejo, A.; Fernandez-Real, J. M., Changes in Circulating Micrornas Are Associated with Childhood Obesity. *J Clin Endocrinol Metab* 2013, 98 (10), E1655-1660.
18. Marzano, F.; Faienza, M. F.; Caratozzolo, M. F.; Brunetti, G.; Chiara, M.; Homer, D. S.; Annese, A.; D'Erchia, A. M.; Consiglio, A.; Pesole, G.; Sbisa, E.; Inzaghi, E.; Cianfarani, S.; Tullo, A., Pilot Study on Circulating Mirna Signature in Children with Obesity Born Small for Gestational Age and Appropriate for Gestational Age. *Pediatr Obes* 2018, 13 (12), 803-811.
19. Ortega, F. J.; Mercader, J. M.; Catalan, V.; Moreno-Navarrete, J. M.; Pueyo, N.; Sabater, M.; Gomez-Ambrosi, J.; Anglada, R.; Fernandez-Formoso, J. A.; Ricart, W.; Fruhbeck, G.; Femandez-Real, J. M., Targeting the Circulating Microrna Signature of Obesity. *Clin Chem* 2013, 59 (5), 781-792.
20. Wang, R.; Hong, J.; Cao, Y.; Shi, J.; Gu, W.; Ning, G.; Zhang, Y.; Wang, W., Elevated Circulating Microrna-122 Is Associated with Obesity and Insulin Resistance in Young Adults. *Eur J Endocrinol* 2015, 172 (3), 291-300.
21. Gillet, V.; Ouellet, A.; Stepanov, Y.; Rodosthenous, R. S.; Croft, E. K.; Brennan, K.; Abdelouahab, N.; Baccarelli, A.; Takser, L., Mirna Profiles in Extracellular Vesicles from Serum Early in Pregnancies Complicated by Gestational Diabetes Mellitus. *J Clin Endocrinol Metab* 2019, 104 (11), 5157-5169.
22. Pastukh, N.; Meerson, A.; Kalish, D.; Jabaly, H.; Blum, A., Serum Mir-122 Levels Correlate with Diabetic Retinopathy. *Clin Exp Med* 2019, 19 (2), 255-260.
23. Regmi, A.; Liu, G.; Zhong, X.; Hu, S.; Ma, R.; Gou, L.; Zafar, M. I.; Chen, L., Evaluation of Serum Micrornas in Patients with Diabetic Kidney Disease: A Nested Case-Controlled Study and Bioinformatics Analysis. *Med Sci Monit* 2019, 25, 1699-1708.
24. Li, X.; Yang, Y.; Wang, L.; Qiao, S.; Lu, X.; Wu, Y.; Xu, B.; Li, H.; Gu, D., Plasma Mir-122 and Mir-3149 Potentially Novel Biomarkers for Acute Coronary Syndrome. *PLoS One* 2015, 10 (5), e0125430.
25. Corsten, M. F.; Dennert, R.; Jochems, S.; Kuznetsova, T.; Devaux, Y.; Hofstra, L.; Wagner, D. R.; Staessen, J. A.; Heymans, S.; Schroen, B., Circulating Microrna-208b and Microrna-499 Reflect Myocardial Damage in Cardiovascular Disease. *Circ Cardiovasc Genet* 2010, 3 (6), 499-506.
26. Gao, W.; He, H. W.; Wang, Z. M.; Zhao, H.; Lian, X. Q.; Wang, Y. S.; Zhu, J.; Yan, J. J.; Zhang, D. G.; Yang, Z. J.; Wang, L. S., Plasma Levels of Lipometabolism-Related Mir-122 and Mir-370 Are Increased in Patients with Hyperlipidemia and Associated with Coronary Artery Disease. *Lipids Health Dis* 2012, 11, 55.
27. Novak, J.; Olejnickova, V.; Tkacova, N.; Santulli, G., Mechanistic Role of Micrornas in Coupling Lipid Metabolism and Atherosclerosis. *Adv Exp Med Biol* 2015, 887, 79-100.
28. Ludwig, N.; Leidinger, P.; Becker, K.; Backes, C.; Fehlmann, T.; Pallasch, C.; Rheinheimer, S.; Meder, B.;

Stahler, C.; Meese, E.; Keller, A., Distribution of Mirna Expression across Human Tissues. *Nucleic Acids Res* 2016, 44 (8), 3865-3877.

29. Huang, X.; Yuan, T.; Tschannen, M.; Sun, Z.; Jacob, H.; Du, M.; Liang, M.; Dittmar, R. L.; Liu, Y.; Liang, M.; Kohli, M.; Thibodeau, S. N.; Boardman, L.; Wang, L., Characterization of Human Plasma-Derived Exosomal Rnas by Deep Sequencing. *BMC Genomics* 2013, 14, 319.

30. Willeit, P.; Skroblin, P.; Kiechl, S.; Fernandez-Hemando, C.; Mayr, M., Liver Micromas: Potential Mediators and Biomarkers for Metabolic and Cardiovascular Disease? *Eur Heart J* 2016, 37 (43), 3260-3266.

31. Brandt, S.; Roos, J.; Inzaghi, E.; Kotnik, P.; Kovac, J.; Battelino, T.; Cianfarani, S.; Nobili, V.; Colajacomo, M.; Kratzer, W.; Denzer, C.; Fischer-Posovszky, P.; Wabitsch, M., Circulating Levels of Mir-122 and Nonalcoholic Fatty Liver Disease in Pre-Pubertal Obese Children. *Pediatr Obes* 2018, 13 (3), 175-182.

32. Vliegenthart, A. D.; Shaffer, J. M.; Clarke, J. I.; Peeters, L. E.; Caporali, A.; Bateman, D. N.; Wood, D. M.; Dargan, P. I.; Craig, D. G.; Moore, J. K.; Thompson, A. I.; Henderson, N. C.; Webb, D. J.; Sharkey, J.; Antoine, D. J.; Park, B. K.; Bailey, M. A.; Lader, E.; Simpson, K. J.; Dear, J. W., Comprehensive Microrna Profiling in Acetaminophen Toxicity Identifies Novel Circulating Biomarkers for Human Liver and Kidney Injury. *Sci Rep* 2015, 5, 15501.

33. Gaddam, R. R.; Jecobsen, V. P.; Kim, Y. R.; Kumar, S.; Gabani, M.; Jacobs, J. S.; Dhuri, K.; Kassan, M.; Li, Q.; Bahal, R.; Roghair, R.; Irani, K.; Vikram, A., Microbiota-Govemed Microrna-204 Impairs Endothelial Function and Blood Pressure Decline During Inactivity in Db/Db Mice. *Sci Rep* 2020.

34. Wu, X.; Du, X.; Yang, Y.; Liu, X.; Liu, X.; Zhang, N.; Li, Y.; Jiang, X.; Jiang, Y.; Yang, Z., Inhibition of Mir-122 Reduced Atherosclerotic Lesion Formation by Regulating Npas3-Mediated Endothelial to Mesenchymal Transition. *Life Sci* 2021, 265, 118816.

35. Lima, J. F.; Cerqueira, L.; Figueiredo, C.; Oliveira, C.; Azevedo, N. F., Anti-Mirna Oligonucleotides: A Comprehensive Guide for Design. *RNA Biol* 2018, 15 (3), 338-352.

36. Roberts, T. C.; Langer, R.; Wood, M. J. A., Advances in Oligonucleotide Drug Delivery. *Nat Rev Drug Discov* 2020, 19 (10), 673-694.

37. Geary, R. S.; Norris, D.; Yu, R.; Bennett, C. F., Pharmacokinetics, Biodistribution and Cell Uptake of Antisense Oligonucleotides. *Adv Drug Deliv Rev* 2015, 87, 46-51.

38. McMahon, B. M.; Mays, D.; Lipsky, J.; Stewart, J. A.; Fauq, A.; Richelson, E., Pharmacokinetics and Tissue Distribution of a Peptide Nucleic Acid after Intravenous Administration. *Antisense Nucleic Acid Drug Dev* 2002, 12 (2), 65-70.

39. Dhuri, K.; Bechtold, C.; Quijano, E.; Pham, H.; Gupta, A.; Vikram, A.; Bahal, R., Antisense Oligonucleotides: An Emerging Area in Drug Discovery and Development. *J Clin Med* 2020, 9 (6).

40. Quijano, E.; Bahal, R.; Ricciardi, A.; Saltzman, W. M.; Glazer, P. M., Therapeutic Peptide Nucleic Acids: Principles, Limitations, and Opportunities. *Yale J Biol Med* 2017, 90 (4), 583-598.

41. Hyrup, B.; Nielsen, P. E., Peptide Nucleic Acids (Pna): Synthesis, Properties and Potential Applications. *Bioorg Med Chem* 1996, 4 (1), 5-23.

42. Pellestor, F.; Paulasova, P., The Peptide Nucleic Acids (Pnas), Powerful Tools for Molecular Genetics and Cytogenetics. *Eur J Hum Genet* 2004, 12 (9), 694-700.

43. Egholm, M.; Buchardt, O.; Christensen, L.; Behrens, C.; Freier, S. M.; Driver, D. A.; Berg, R. H.; Kim, S. K.; Norden, B.; Nielsen, P. E., Pna Hybridizes to Complementary Oligonucleotides Obeying the Watson-Crick Hydrogen-Bonding Rules. *Nature (London)* 1993, 365 (6446), 566-568.

44. Nielsen, P. E.; Egholm, M.; Berg, R. H.; Buchardt, O., Sequence-Selective Recognition of DNA by Strand Displacement with a Thymine-Substituted Polyamide. *Science* (Washington, D.C., 1883-) 1991, 254 (5037), 1497-1500.

45. Demidov, V. V.; Potaman, V. N.; Frank-Kamenetskii, M. D.; Egholm, M.; Buchard, O.; Sonnichsen, S. H.; Nielsen, P. E., Stability of Peptide Nucleic Acids in Human Serum and Cellular Extracts. *Biochem Pharmacol* 1994, 48 (6), 1310-1313.

46. Yeh, J. I.; Shivachev, B.; Rapireddy, S.; Crawford, M. J.; Gil, R. R.; Du, S.; Madrid, M.; Ly, D. H., Crystal Structure of Chiral Gammapna with Complementary DNA Strand: Insights into the Stability and Specificity of Recognition and Conformational Preorganization. *J Am Chem Soc* 2010,132 (31), 10717-10727.

47. Crawford, M. J.; Rapireddy, S.; Bahal, R.; Sacui, I.; Ly, D. H., Effect of Steric Constraint at the Gamma-Backbone Position on the Conformations and Hybridization Properties of Pnas. *J Nucleic Acids* 2011, 2011, 652702.

48. Sahu, B.; Sacui, I.; Rapireddy, S.; Zanotti, K. J.; Bahal, R.; Armitage, B. A.; Ly, D. H., Synthesis and Characterization of Conformationally Preorganized, (R)-Diethylene Glycol-Containing Gamma-Peptide Nucleic Acids with Superior Hybridization Properties and Water Solubility. *J Org Chem* 2011, 76 (14), 5614-5627.

49. He, G.; Rapireddy, S.; Bahal, R.; Sahu, B.; Ly, D. H., Strand Invasion of Extended, Mixed-Sequence B-DNA by Fpnas. *J. Am. Chem. Soc.* 2009, 131 (34), 12088-12090.

50. Sahu, B.; Sacui, I.; Rapireddy, S.; Zanotti, K. J.; Bahal, R.; Armitage, B. A.; Ly, D. H., Synthesis and Characterization of Conformationally Preorganized, (R)-Diethylene Glycol-Containing F-Peptide Nucleic Acids with Superior Hybridization Properties and Water Solubility. *J. Org. Chem.* 2011, 76 (14), 5614-5627.

51. Singer, A.; Rapireddy, S.; Ly, D. H.; Meller, A., Electronic Barcoding of a Viral Gene at the Single-Molecule Level. *Nano Lett.* 2012, 12 (3), 1722-1728.

52. Kumar, S.; Pearse, A.; Liu, Y.; Taylor, R. E., Modular Self-Assembly of Gamma-Modified Peptide Nucleic Acids in Organic Solvent Mixtures. *Nat Commun* 2020, 11 (1), 2960.

53. Bahal, R.; Ali McNeer, N.; Quijano, E.; Liu, Y.; Sulkowski, P.; Turchick, A.; Lu, Y. C.; Bhunia, D. C.; Manna, A.; Greiner, D. L.; Brehm, M. A.; Cheng, C. J.; Lopez-Giraldez, F.; Ricciardi, A.; Beloor, J.; Krause, D. S.; Kumar, P.; Gallagher, P. G.; Braddock, D. T.; Mark Saltzman, W.; Ly, D. H.; Glazer, P. M., In Vivo Correction of Anaemia in Beta-Thalassemic Mice by Gammapna-Mediated Gene Editing with Nanoparticle Delivery. *Nat Commun* 2016, 7, 13304.

54. Bahal, R.; Quijano, E.; McNeer, N. A.; Liu, Y.; Bhunia, D. C.; Lopez-Giraldez, F.; Fields, R. J.; Saltzman, W. M.; Ly, D. H.; Glazer, P. M., Single-Stranded Gammapnas for in Vivo Site-Specific Genome Editing Via Watson-Crick Recognition. *Curr Gene Ther* 2014, 14 (5), 331-342.

55. Ricciardi, A. S.; Bahal, R.; Farrelly, J. S.; Quijano, E.; Bianchi, A. H.; Luks, V. L.; Putman, R.; Lopez-Giraldez, F.; Coskun, S.; Song, E.; Liu, Y.; Hsieh, W. C.; Ly, D. H.; Stitelman, D. H.; Glazer, P. M.; Saltzman, W. M., In Utero Nanoparticle Delivery for Site-Specific Genome Editing. *Nat Commun* 2018, 9 (1), 2481.
56. McNeer, N. A.; Anandalingam, K.; Fields, R. J.; Caputo, C.; Kopic, S.; Gupta, A.; Quijano, E.; Polikoff, L.; Kong, Y.; Bahal, R.; Geibel, J. P.; Glazer, P. M.; Saltzman, W. M.; Egan, M. E., Correction of F508del Cftr in Airway Epithelium Using Nanoparticles Delivering Triplex-Forming Pnas. *Nature Communications* 2015, in press.
57. Kaplan, A. R.; Pham, H.; Liu, Y.; Oyaghire, S.; Bahal, R.; Engelman, D. M.; Glazer, P. M., Ku80-Targeted Ph-Sensitive Peptide-Pna Conjugates Are Tumor Selective and Sensitize Cancer Cells to Ionizing Radiation. *Mol Cancer Res* 2020, 18 (6), 873-882.
58. Thomas, S. M.; Sahu, B.; Rapireddy, S.; Bahal, R.; Wheeler, S. E.; Procopio, E. M.; Kim, J.; Joyce, S. C.; Contrucci, S.; Wang, Y.; Chiosea, S. I.; Lathrop, K. L.; Watkins, S.; Grandis, J. R.; Armitage, B. A.; Ly, D. H., Antitumor Effects of Egfr Antisense Guanidine-Based Peptide Nucleic Acids in Cancer Models. *ACS Chem Biol* 2013, 8 (2), 345-352.
59. Manna, A.; Rapireddy, S.; Bahal, R.; Ly, D. H., Minipeg-Gammapna. *Methods Mol Biol* 2014, 1050, 1-12.
60. Csak, T.; Bala, S.; Lippai, D.; Satishchandran, A.; Catalano, D.; Kodys, K.; Szabo, G., Microrna-122 Regulates Hypoxia-Inducible Factor-1 and Vimentin in Hepatocytes and Correlates with Fibrosis in Diet-Induced Steatohepatitis. *Liver Int* 2015, 35 (2), 532-541.
61. Zhao, L.; Ma, R.; Zhang, L.; Yuan, X.; Wu, J.; He, L.; Liu, G.; Du, R., Inhibition of Hif-1a-Mediated Tlr4 Activation Decreases Apoptosis and Promotes Angiogenesis of Placental Microvascular Endothelial Cells During Severe Pre-Eclampsia Pathogenesis. *Placenta* 2019, 83, 8-16.
62. Schwingshackl, L.; Hoffmann, G., Comparison of the Long-Term Effects of High-Fat V. Low-Fat Diet Consumption on Cardiometabolic Risk Factors in Subjects with Abnormal Glucose Metabolism: A Systematic Review and Meta-Analysis. *Br J Nutr* 2014, 111 (12), 2047-2058.
63. Mozaffarian, D., Dietary and Policy Priorities for Cardiovascular Disease, Diabetes, and Obesity: A Comprehensive Review. *Circulation* 2016, 133 (2), 187-225.
64. Vikram, A.; Kim, Y. R.; Kumar, S.; Li, Q.; Kassan, M.; Jacobs, J. S.; Irani, K., Vascular Microrna-204 Is Remotely Governed by the Microbiome and Impairs Endothelium-Dependent Vasorelaxation by Downregulating Sirtuin1. *Nat Commun* 2016, 7, 12565.
65. Patsouris, D.; Reddy, J. K.; Muller, M.; Kersten, S., Peroxisome Proliferator-Activated Receptor Alpha Mediates the Effects of High-Fat Diet on Hepatic Gene Expression. *Endocrinology* 2006, 147 (3), 1508-1516.
66. Guerre-Millo, M.; Rouault, C.; Poulain, P.; Andre, J.; Poitout, V.; Peters, J. M.; Gonzalez, F. J.; Fruchart, J. C.; Reach, G.; Staels, B., Ppar-Alpha-Null Mice Are Protected from High-Fat Diet-Induced Insulin Resistance. *Diabetes* 2001, 50 (12), 2809-2814.
67. Castano, C.; Kalko, S.; Novials, A.; Parrizas, M., Obesity-Associated Exosomal Mirnas Modulate Glucose and Lipid Metabolism in Mice. *Proc Natl Acad Sci USA* 2018, 115 (48), 12158-12163.
68. Schwenger, K. J. P.; Chen, L.; Chelliah, A.; Da Silva, H. E.; Teterina, A.; Comelli, E. M.; Taibi, A.; Arendt, B. M.; Fischer, S.; Allard, J. P., Markers of Activated Inflammatory Cells Are Associated with Disease Severity and Intestinal Microbiota in Adults with Nonalcoholic Fatty Liver Disease. *Int J Mol Med* 2018, 42 (4), 2229-2237.
69. Chen, J.; Zhang, W.; Xu, Q.; Zhang, J.; Chen, W.; Xu, Z.; Li, C.; Wang, Z.; Zhang, Y.; Zhen, Y.; Feng, J.; Chen, J.; Chen, J., Ang-(1-7) Protects Huvecs from High Glucose-Induced Injury and Inflammation Via Inhibition of the Jak2/Stat3 Pathway. *Int J Mol Med* 2018, 41 (5), 2865-2878.
70. Mazrouei, S.; Sharifpanah, F.; Caldwell, R. W.; Franz, M.; Shatanawi, A.; Muessig, J.; Fritzenwanger, M.; Schulze, P. C.; Jung, C., Regulation of Map Kinase-Mediated Endothelial Dysfunction in Hyperglycemia Via Arginase I and Enos Dysregulation. *Biochim Biophys Acta Mol Cell Res* 2019, 1866 (9), 1398-1411.
71. Giurdanella, G.; Lupo, G.; Gennuso, F.; Conti, F.; Fumo, D. L.; Mannino, G.; Anfuso, C. D.; Drago, F.; Salomone, S.; Bucolo, C., Activation of the Vegf-a/Erk/Pla2 Axis Mediates Early Retinal Endothelial Cell Damage Induced by High Glucose: New Insight from an in Vitro Model of Diabetic Retinopathy. *Int J Mol Sci* 2020, 21 (20).
72. Taniguchi, K.; Xia, L.; Goldberg, H. J.; Lee, K. W.; Shah, A.; Stavar, L.; Masson, E. A.; Momen, A.; Shikatani, E. A.; John, R.; Husain, M.; Fantus, I. G., Inhibition of Src Kinase Blocks High Glucose-Induced Egfr Transactivation and Collagen Synthesis in Mesangial Cells and Prevents Diabetic Nephropathy in Mice. *Diabetes* 2013, 62 (11), 3874-3886.
73. van der Ree, M. H.; de Vree, J. M.; Stelma, F.; Willemse, S.; van der Valk, M.; Rietdijk, S.; Molenkamp, R.; Schinkel, J.; van Nuenen, A. C.; Beuers, U.; Hadi, S.; Harbers, M.; van der Veer, E.; Liu, K.; Grundy, J.; Patick, A. K.; Pavlicek, A.; Blem, J.; Huang, M.; Grint, P.; Neben, S.; Gibson, N. W.; Kootstra, N. A.; Reesink, H. W., Safety, Tolerability, and Antiviral Effect of Rg-101 in Patients with Chronic Hepatitis C: A Phase Ib, Double-Blind, Randomised Controlled Trial. *Lancet* 2017, 389 (10070), 709-717.
74. Janssen, H. L.; Reesink, H. W.; Lawitz, E. J.; Zeuzem, S.; Rodriguez-Torres, M.; Patel, K.; van der Meer, A. J.; Patick, A. K.; Chen, A.; Zhou, Y.; Persson, R.; King, B. D.; Kauppinen, S.; Levin, A. A.; Hodges, M. R., Treatment of Hcv Infection by Targeting Microrna. *N Engl J Med* 2013, 368 (18), 1685-1694.
75. van der Ree, M. H.; van der Meer, A. J.; de Bruijne, J.; Maan, R.; van Vliet, A.; Welzel, T. M.; Zeuzem, S.; Lawitz, E. J.; Rodriguez-Torres, M.; Kupcova, V.; Wiercinska-Drapalo, A.; Hodges, M. R.; Janssen, H. L.; Reesink, H. W., Long-Term Safety and Efficacy of Microrna-Targeted Therapy in Chronic Hepatitis C Patients. *Antiviral Res* 2014, 111, 53-59.
76. Deng, Y.; Campbell, F.; Han, K.; Theodore, D.; Deeg, M.; Huang, M.; Hamatake, R.; Lahiri, S.; Chen, S.; Horvath, G.; Manolakopoulos, S.; Dalekos, G. N.; Papatheodoridis, G.; Goulis, I.; Banyai, T.; Jilma, B.; Leivers, M., Randomized Clinical Trials Towards a Single-Visit Cure for Chronic Hepatitis C: Oral Gsk2878175 and Injectable Rg-101 in Chronic Hepatitis C Patients and Long-Acting Injectable Gsk2878175 in Healthy Participants. *J Viral Hepat* 2020, 27 (7), 699-708.
77. Stelma, F.; van der Ree, M. H.; Sinnige, M. J.; Brown, A.; Swadling, L.; de Vree, J. M. L.; Willemse, S. B.; van der Valk, M.; Grint, P.; Neben, S.; Klenerman, P.; Barnes, E.; Kootstra, N. A.; Reesink, H. W., Immune Phenotype and Function of Natural Killer and T Cells in Chronic Hepatitis C Patients Who Received a Single Dose of Anti-Microrna-122, Rg-101. *Hepatology* 2017, 66 (1), 57-68.

78. Lanford, R. E.; Hildebrandt-Eriksen, E. S.; Petri, A.; Persson, R.; Lindow, M.; Munk, M. E.; Kauppinen, S.; Orum, H., Therapeutic Silencing of Microrna-122 in Primates with Chronic Hepatitis C Virus Infection. *Science* 2010, 327 (5962), 198-201.
79. Jones, D., Setbacks Shadow Microrna Therapies in the Clinic. *Nat Biotechnol* 2018, 36 (10), 909-910.
80. Tsai, W. C.; Hsu, P. W.; Lai, T. C.; Chau, G. Y.; Lin, C. W.; Chen, C. M.; Lin, C. D.; Liao, Y. L.; Wang, J. L.; Chau, Y. P.; Hsu, M. T.; Hsiao, M.; Huang, H. D.; Tsou, A. P., Microrna-122, a Tumor Suppressor Microrna That Regulates Intrahepatic Metastasis of Hepatocellular Carcinoma. *Hepatology* 2009, 49 (5), 1571-1582.
81. Tsai, W. C.; Hsu, S. D.; Hsu, C. S.; Lai, T. C.; Chen, S. J.; Shen, R.; Huang, Y.; Chen, H. C.; Lee, C. H.; Tsai, T. F.; Hsu, M. T.; Wu, J. C.; Huang, H. D.; Shiao, M. S.; Hsiao, M.; Tsou, A. P., Microrna-122 Plays a Critical Role in Liver Homeostasis and Hepatocarcinogenesis. *J Clin Invest* 2012, 122 (8), 2884-2897.
82. Hsu, S. H.; Wang, B.; Kota, J.; Yu, J.; Costinean, S.; Kutay, H.; Yu, L.; Bai, S.; La Perle, K.; Chivukula, R. R.; Mao, H.; Wei, M.; Clark, K. R.; Mendell, J. R.; Caligiuri, M. A.; Jacob, S. T.; Mendell, J. T.; Ghoshal, K., Essential Metabolic, Anti-Inflammatory, and Anti-Tumorigenic Functions of Mir-122 in Liver. *J Clin Invest* 2012, 122 (8), 2871-2883.
83. Advani, R.; Lum, B. L.; Fisher, G. A.; Halsey, J.; Geary, R. S.; Holmlund, J. T.; Kwoh, T. J.; Dorr, F. A.; Sikic, B. I., A Phase I Trial of Aprinocarsen (Isis 3521/Ly900003), an Antisense Inhibitor of Protein Kinase C-Alpha Administered as a 24-Hour Weekly Infusion Schedule in Patients with Advanced Cancer. *Invest New Drugs* 2005, 23 (5), 467-477.
84. Desai, A. A.; Schilsky, R. L.; Young, A.; Janisch, L.; Stadler, W. M.; Vogelzang, N. J.; Cadden, S.; Wright, J. A.; Ratain, M. J., A Phase I Study of Antisense Oligonucleotide Gti-2040 Given by Continuous Intravenous Infusion in Patients with Advanced Solid Tumors. *Ann Oncol* 2005, 16 (6), 958-965.
85. Kahan, B. D.; Stepkowski, S.; Kilic, M.; Katz, S. M.; Van Buren, C. T.; Welsh, M. S.; Tami, J. A.; Shanahan, W. R., Jr., Phase I and Phase Ii Safety and Efficacy Trial of Intercellular Adhesion Molecule-1 Antisense Oligodeoxynucleotide (Isis 2302) for the Prevention of Acute Allograft Rejection. *Transplantation* 2004, 78 (6), 858-863.
86. Yu, R. Z.; Lemonidis, K. M.; Graham, M. J.; Matson, J. E.; Crooke, R. M.; Tribble, D. L.; Wedel, M. K.; Levin, A. A.; Geary, R. S., Cross-Species Comparison of in Vivo Pk/Pd Relationships for Second-Generation Antisense Oligonucleotides Targeting Apolipoprotein B-100. *Biochem Pharmacol* 2009, 77 (5), 910-919.
87. Iannitti, T.; Morales-Medina, J. C.; Palmieri, B., Phosphorothioate Oligonucleotides: Effectiveness and Toxicity. *Curr Drug Targets* 2014, 15 (7), 663-673.
88. Gupta, A.; Quijano, E.; Liu, Y.; Bahal, R.; Scanlon, S. E.; Song, E.; Hsieh, W. C.; Braddock, D. E.; Ly, D. H.; Saltzman, W. M.; Glazer, P. M., Anti-Tumor Activity of Minipeg-Gamma-Modified Pnas to Inhibit Microrna-210 for Cancer Therapy. *Mol Ther Nucleic Acids* 2017, 9, 111-119.
89. Gupta, A.; Mishra, A.; Puri, N., Peptide Nucleic Acids: Advanced Tools for Biomedical Applications. *J Biotechnol* 2017, 259, 148-159.
90. Arroyo, J. D.; Chevillet, J. R.; Kroh, E. M.; Ruf, I. K.; Pritchard, C. C.; Gibson, D. F.; Mitchell, P. S.; Bennett, C. F.; Pogosova-Agadjanyan, E. L.; Stirewalt, D. L.; Tait, J. F.; Tewari, M., Argonaute2 Complexes Carry a Population of Circulating Micrornas Independent of Vesicles in Human Plasma. *Proc Natl Acad Sci USA* 2011, 108 (12), 5003-5008.
91. Prud'homme, G. J.; Glinka, Y.; Lichner, Z.; Yousef, G. M., Neuropilin-1 Is a Receptor for Extracellular *Mirna* and Ago2/Mirna Complexes and Mediates the Internalization of Mirnas That Modulate Cell Function. *Oncotarget* 2016, 7 (42), 68057-68071.
92. Soker, S.; Takashima, S.; Miao, H. Q.; Neufeld, G.; Klagsbrun, M., Neuropilin-1 Is Expressed by Endothelial and Tumor Cells as an Isoform-Specific Receptor for Vascular Endothelial Growth Factor. *Cell* 1998, 92 (6), 735-745.
93. Li, Y.; Yang, N.; Dong, B.; Yang, J.; Kou, L.; Qin, Q., Microrna-122 Promotes Endothelial Cell Apoptosis by Targeting Xiap: Therapeutic Implication for Atherosclerosis. *Life Sci* 2019, 232, 116590.
94. Zhang, H. G.; Zhang, Q. J.; Li, B. W.; Li, L. H.; Song, X. H.; Xiong, C. M.; Zou, Y. B.; Liu, B. Y.; Han, J. Q.; Xiu, R. J., The Circulating Level of Mir-122 Is a Potential Risk Factor for Endothelial Dysfunction in Young Patients with Essential Hypertension. *Hypertens Res* 2020, 43 (6), 511-517.
95. Wang, Y. L.; Yu, W., Association of Circulating Microrna-122 with Presence and Severity of Atherosclerotic Lesions. *PeerJ* 2018, 6, e5218.
96. Simionescu, N.; Niculescu, L. S.; Carnuta, M. G.; Sanda, G. M.; Stancu, C. S.; Popescu, A. C.; Popescu, M. R.; Vlad, A.; Dimulescu, D. R.; Simionescu, M.; Sima, A. V., Hyperglycemia Determines Increased Specific Micrornas Levels in Sera and Hdl of Acute Coronary Syndrome Patients and Stimulates Micrornas Production in Human Macrophages. *PLoS One* 2016, 11 (8), e0161201.
97. Xu, G.; Chen, J.; Jing, G.; Shalev, A., Thioredoxin-Interacting Protein Regulates Insulin Transcription through Microrna-204. *Nat Med* 2013, 19 (9), 1141-1146.
98. Jo, S.; Chen, J.; Xu, G.; Grayson, T. B.; Thielen, L. A.; Shalev, A., Mir-204 Controls Glucagon-Like Peptide 1 Receptor Expression and Agonist Function. *Diabetes* 2017.
99. Gaddam, R. R.; Kim, Y. R.; Li, Q.; Jacobs, J. S.; Gabani, M.; Mishra, A.; Promes, J. A.; Imai, Y.; Irani, K.; Vikram, A., Genetic Deletion of Mir-204 Improves Glycemic Control Despite Obesity in Db/Db Mice. *Biochem Biophys Res Commun* 2020, 532 (2), 167-172.
100. Chugh, S. N.; Dabla, S.; Jain, V.; Chugh, K.; Sen, J., Evaluation of Endothelial Function and Effect of Glycemic Control (Excellent Vs. Poor/Fair Control) on Endothelial Function in Uncontrolled Type 2 Diabetes Mellitus. *J Assoc Physicians India* 2010, 58, 478-480.

Example 2—Endothelial Cell-Targeted γ-PNA Based miRNA-122 Inhibitor

Figure 11A:
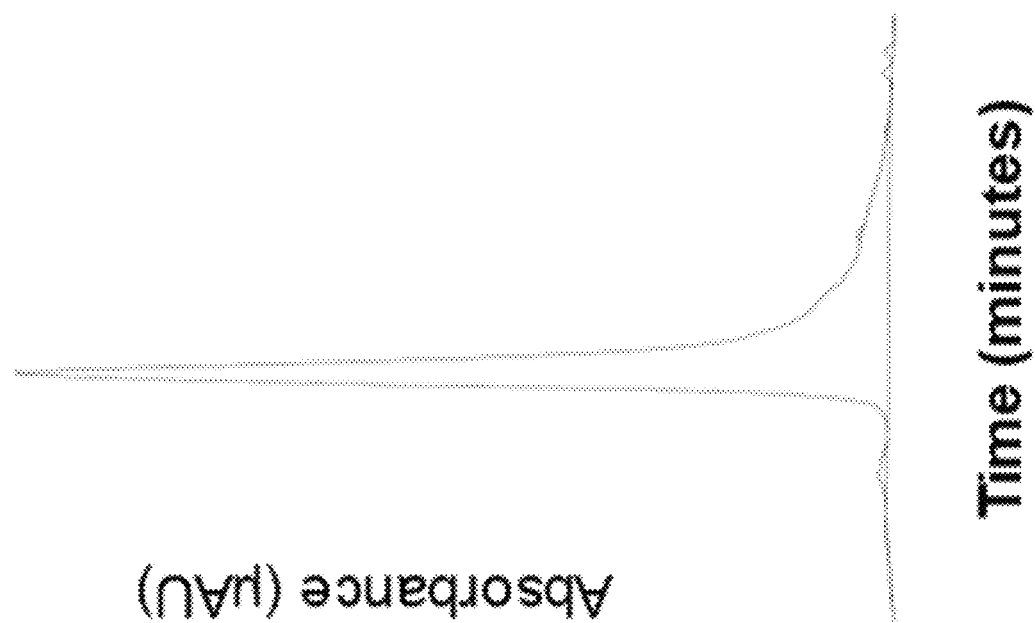

The inventors generated an endothelial cell targeting version of the disclosed γ-PNA inhibitors of miR-122 by fusing the peptide VHPK (SEQ ID NO: 4) to the γ-PNAs of the instant disclosure ("VHPK-γ-PNA fusion"). VHPK binds to vascular cell adhesion molecule 1 (VCAM1) which is highly expressed on the surface of endothelial cells. Referring now to FIG. 11A, the inventors demonstrated, by high-performance liquid chromatography (HPLC), that they have produced a high-purity VHPK-γ-PNA fusion. In FIG. 11B, the inventors demonstrated that the VHPK-γ-PNA fusion shows increased binding to endothelial cells, as measured by fluorescence intensity, than the untagged γ-PNA (left panel) as well as increased binding to endothelial cells as compared to human embryonic kidney (HEK-293) cells (comparing TAMRA-e-γP-122-I in the left panel versus the right panel of FIG. 11B).

Example 3—Combination of γ-PNA-based miR-122 inhibitor with semaglutide or metformin Synergy of γP-122-I (0.25 μmol*kg$^{-1}$) and semaglutide (30 nmol*kg$^{-1}$, administered subcutaneously (sc)) or metformin (200 mg*kg$^{-1}$, administered orally) in high fat diet (HFD)-fed and db/db mice will be determined. Glucose and insulin levels, glucose tolerance, and insulin tolerance will be measured, and hyperglycemic/euglycemic clamp studies will be performed. The inventors anticipate that the combination of the disclosed γP-122-I and semaglutide or the disclosed γP-122-I and metformin will result in additive or synergistic reductions in blood glucose levels, insulin tolerance, and generally treat symptoms of diabetes and cardiovascular disease in the mouse model.

In the foregoing description, it will be readily apparent to one skilled in the art that varying substitutions and modifications may be made to the invention disclosed herein without departing from the scope and spirit of the invention.

The invention illustratively described herein suitably may be practiced in the absence of any element or elements, limitation or limitations which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

Citations to a number of patent and non-patent references may be made herein. The cited references are incorporated by reference herein in their entireties. In the event that there is an inconsistency between a definition of a term in the specification as compared to a definition of the term in a cited reference, the term should be interpreted based on the definition in the specification.

The invention claimed is:

1. A composition comprising, from N terminus to C terminus:

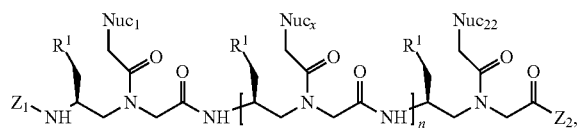

wherein $R^1$ is diethylene glycol;
n is 19;
$Nuc_1$, $Nuc_x$, and $Nuc_{22}$ are nucleic acids selected from adenine, thymine, guanine, and cytosine, wherein x is ascending integers from 2-22 and, wherein, the sequence of $Nuc_{1-22}$ corresponds to the nucleic acid sequence of SEQ ID NO: 1; and $Z_1$ and $Z_2$ are independently 1-5 lysines attached linearly by amide bonds.

2. A pharmaceutical composition comprising the composition of claim 1 and at least one pharmaceutical excipient or carrier.

3. The pharmaceutical composition of claim 2, comprising an additional active agent.

4. A method of treating a disease or disorder associated with aberrant miR-122 expression in a subject in need thereof, the method comprising: administering an effective of the pharmaceutical composition of claim 2 to the subject to treat the disease or disorder.

5. The method of claim 4, wherein the disease or disorder associated with aberrant miR-122 expression is selected from type 2 diabetes, obesity, and hypertension.

6. The method of claim 5, wherein the disease or disorder is type 2 diabetes.

7. The method of claim 4, wherein the administration comprises oral, nasal, topical, or parenteral administration.

8. A method to lower the risk or severity of a cardiovascular event in a subject in need thereof, the method comprising:
administering an effective amount of the pharmaceutical composition of claim 2 to the subject in need thereof.

9. The method of claim 8, wherein the subject in need thereof comprises a subject diagnosed with one or more of type 2 diabetes, obesity, and hypertension, and/or an increased blood level of miR-122.

10. The composition of claim 1, further comprising a targeting peptide.

11. The composition of claim 10, wherein the targeting peptide comprises the amino acid sequence of SEQ ID NO: 3.

* * * * *